US008601058B2

(12) United States Patent
Ahmad et al.

(10) Patent No.: US 8,601,058 B2
(45) Date of Patent: Dec. 3, 2013

(54) MOBILE VIDEOCONFERENCING

(75) Inventors: Khalid Ahmad, Ottawa (CA); Michael Hammer, Reston, VA (US); Kuntal Chowdhury, Andover, MA (US)

(73) Assignee: Cisco Technology, Inc., San Jose, CA (US)

( * ) Notice: Subject to any disclaimer, the term of this patent is extended or adjusted under 35 U.S.C. 154(b) by 156 days.

(21) Appl. No.: 13/071,078

(22) Filed: Mar. 24, 2011

(65) Prior Publication Data

US 2012/0246212 A1  Sep. 27, 2012

(51) Int. Cl.
G06F 15/16 (2006.01)
(52) U.S. Cl.
USPC ........................................................ 709/204
(58) Field of Classification Search
USPC ................. 709/204–207, 227–229, 231–235;
348/14.01–14.02, 14.03–14.08;
370/401–402, 260–266, 270–271;
455/416
See application file for complete search history.

(56) References Cited

U.S. PATENT DOCUMENTS

| 5,674,003 | A | 10/1997 | Andersen et al. | |
|---|---|---|---|---|
| 7,764,623 | B2 | 7/2010 | Stumpert et al. | |
| 7,835,347 | B2 | 11/2010 | Guo | |
| 2006/0233100 | A1* | 10/2006 | Luft et al. | 370/229 |
| 2007/0201473 | A1* | 8/2007 | Bhatia et al. | 370/392 |
| 2008/0123660 | A1 | 5/2008 | Sammour et al. | |
| 2008/0291930 | A1* | 11/2008 | Damola et al. | 370/401 |
| 2008/0305811 | A1 | 12/2008 | Cai et al. | |
| 2010/0208634 | A1 | 8/2010 | Eng et al. | |

OTHER PUBLICATIONS

Alvestrand, "A Datagram Transport for the RTC-Web Profile", draft-alvestrand-dispatch-rtcweb-datagram-01, Feb. 2011 (8 pages).
Alvestrand, "Overview: Real Time Protocols for Brower-based Applications", draft-alvestrand-dispatch-rtcweb-protocols-00, Nov. 11, 2010 (9 pages).
Cisco TelePresence Streaming Service: Extend the Cisco TelePresence Experience Throughout the Enterprise with High-Quality, Cost-Effective, and Scalable Cisco TelePresence Streaming, Cisco Systems, Inc., Oct. 2009, 2 pages.
Deployment Guide for Cisco MXE Video Interoperability System: for Cisco MXE-OS and Cisco MXE 5000 Series, Cisco Systems, Inc. San Jose, California. Oct. 15, 2010. 162 pages.
Marjou, "Requirements for Interworking Between RTC-Web and SIP-RTP Protocols", draft-marjou-dispatch-rtcweb-sip-rtp-interwk-reqs-00, Feb. 9, 2011 (12 pages).

(Continued)

Primary Examiner — Chirag R Patel
(74) Attorney, Agent, or Firm — Wilmer Cutler Pickering Hale and Dorr LLP

(57) ABSTRACT

In one embodiment, a gateway implements: detecting that a mobile device using a communication session in a mobile network is associated with a mobile videoconferencing application, where the videoconferencing application is capable of sending and receiving media streams; and providing from the mobile network to a videoconferencing system within a fixed network a first set of indicators associated with the communication session, and performing policy control, the policy control including: causing the videoconferencing system within the fixed network to be configured to accommodate communications with the mobile device, causing an adjustment to a session bearer within the mobile network to meet a quality of service requirement of a videoconferencing media stream connected to the mobile device, and causing a media bridge to provide a media stream to accommodate the end point.

30 Claims, 8 Drawing Sheets

(56) References Cited

OTHER PUBLICATIONS

Polk, et al. "The Session Description Protocol (SDP) 'serviceless' Attribute: draft-polk-mmusic-service-class-for-adp-00." Cisco Systems, Network WG, Internet-Draft. Jul. 5, 2010. 8 pages.
Tandberg Movi Product Sheet. Cisco Systems. 2 pages.
Telepresence Interoperability Protocol ("TIP") Version 7.0 (Aug. 18, 2010), and associated license agreement (60 pages).
Telepresence Interoperability Protocol (TIP) Version 7.0 (Jul. 1, 2010), and associated license agreement (60 pages).
International Search Report and Written Opinion for International Application No. PCT/US12/29950 mailed Jun. 29, 2012. 14 pages.

* cited by examiner

MOBILE VIDEOCONFERENCING

FIELD OF THE DISCLOSURE

This disclosure relates to providing videoconferencing on a mobile network.

BACKGROUND

Videoconferencing generally refers to technologies that allow people to feel and appear as if they were present at a place other than their true location. Videoconferencing can make use of video and other technologies that together implement the sensory elements of vision, sound, and manipulation. Videoconferencing systems may be implemented as conference rooms with special tables, large-format video screens, microphones, speakers, cameras, collaboration interfaces and lighting, that are connected via networks to other videoconferencing systems so that participants in a videoconferencing session feel as if they are all together in one conference room. Other implementations may include only desktop-based videophones for participants.

Videoconferencing systems are typically "fixed," in that the media streams they use to communicate information between participants are hosted on fixed wireline access networks, in which the media streams travel over relatively high bandwidth wires. In contrast, mobile devices such as smartphones communicate over wireless networks, which often have more limited bandwidth and quality of service (QoS) than wireline networks. Fully extending videoconferencing capabilities to such mobile devices presents numerous challenges, including those caused by both the limitations of the mobile devices and of the wireless networks in which the devices operate. While it is generally known to configure a videoconferencing session to stream a one-way video and/or audio media stream to a mobile device, and to allow the mobile device to send information to videoconferencing participants by communicating through collaborative tools, such configurations are limited by the mobile environment, and do not provide the mobile user with the qualities and capabilities that users have come to expect when using fixed videoconferencing systems.

OVERVIEW

Mobile Videoconferencing

Figure 1:
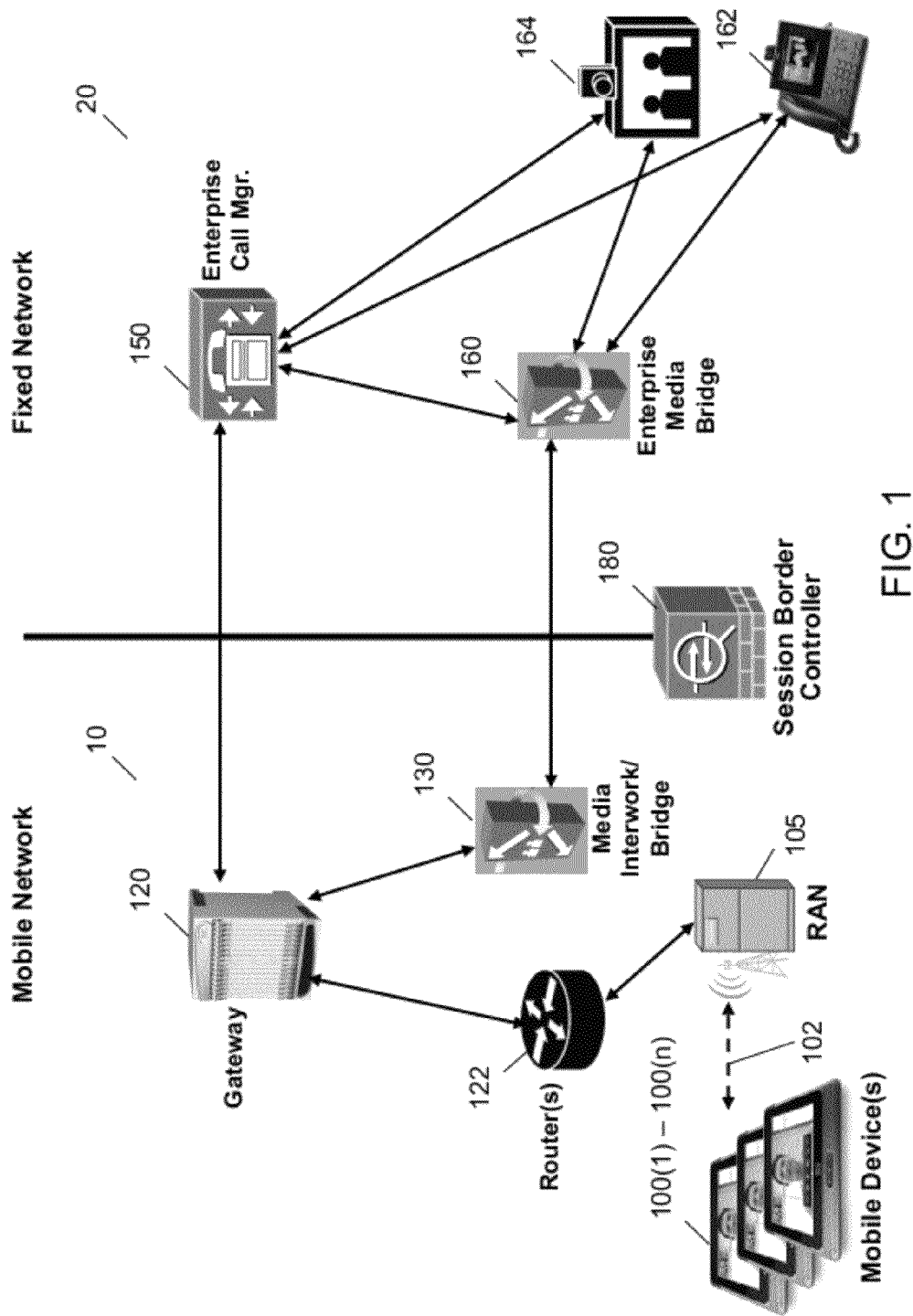
FIG. 1 illustrates a communication network in accordance with some embodiments.

The following embodiments can help to extend fixed videoconferencing conference capabilities to mobile devices. These embodiments use the service intelligence available on a mobile gateway that is linked to a videoconferencing system in a way that can improve the use of the network resources to provide the videoconferencing experience to the mobile device. New messaging protocols and interaction between the videoconferencing system and a mobile gateway transfer service-related information to/from the videoconferencing system to route and accommodate the videoconferencing call to the mobile device. This is performed in a way that helps improve the video and audio flows to the mobile device independent of the wireless access network technology and available resources. By enabling and inter-connecting the service and network intelligence available in the mobile gateway to the videoconferencing system, there can be close coupling between the two systems, and the service-related information and intelligence can be used improve the videoconferencing experience.

For example, in some embodiments, service-related information may be used for improving the transcoding and transrating of the video streams for the specific mobile device and subscriber profile. The mobile gateway may need to separate out and split a single session coming from the fixed videoconferencing and deliver it to the mobile handset over multiple access network sessions and the converse in the opposite direction. The gateway may also need to adapt the video feed to match the expected aspect ratio and other characteristics required of the fixed videoconferencing displays and vice versa. For example, head shot images may need to be scaled and cropped or filled in to provide "normal" head/body display sizes. If there are pan, tilt, and zoom capabilities on the mobile, these too may be interworked. The gateway may also need to employ techniques for voice recognition, and filter out background noise from triggering videoconferencing automatic position selection. Also, the gateway may ensure that voice levels from mobiles are attenuated appropriately for the conference listeners. Alone or together, these embodiments allow the mobile user to experience as close to the static (fixed) videoconferencing experience on a mobile device as is possible given the capabilities of the videoconferencing application (client software) associated with and installed on the mobile device. These embodiments allow mobile devices that are "videoconferencing aware" to establish a session to the Enterprise videoconferencing control elements, which are then able to tailor the call leg to the mobile network, and to interact with the mobile network to deliver appropriate QoS.

As noted above, videoconferencing systems may be either Enterprise or Service Provider hosted. For example, the mobile network may be a WiFi network hosted by the Enterprise, or an LTE or WiMax-based network hosted by a Service Provider, such as a wireless provider. In some embodiments, the mobile network is enhanced to enable dynamic monitoring and matching of bandwidth resources to the call leg to deliver a quality of experience as a premium service by the Service Provider.

In a first set of embodiments, a method of comprises establishing a wireless communication session with a mobile device; determining that the mobile device is associated with a mobile videoconferencing application, wherein the mobile videoconferencing application is capable of sending and receiving media streams; and providing, from a mobile network to a videoconferencing system within a fixed network, a first set of indicators associated with the communication session, and performing policy control, the policy control including: causing the videoconferencing system within the fixed network to be configured for communicating with the mobile device, wherein the configuration is different from a configuration used by the videoconferencing system for communicating with videoconferencing end points within the fixed network, and causing a session bearer within the mobile network to be adjusted to meet a quality of service (QoS) requirement of a videoconferencing media stream connected to the mobile device, the session bearer carrying the videoconferencing media stream, and causing a media bridge to process the videoconferencing media stream, wherein the videoconferencing media stream is processed by the media bridge using an operating mode that is different than an operating mode used for processing media streams for videoconferencing end points within the fixed network.

In certain of these embodiments, at least one of indicators of the first set of indicators is provided using one of a Session Description Protocol (SDP) 'servclass' attribute and an Internet Media Services (IMS) P-Access-Network-Info header; causing a media bridge to process the videoconferencing media stream includes causing the media bridge to enhance the perceived continuity of a data flow; and/or determining that the mobile device is associated with a videoconferencing application is performed using deep packet inspection.

In some of these embodiments, the first set of indicators associated with the communication session includes an indication of at least one of: the association of the mobile device with a mobile videoconferencing application, the use by the mobile device of the mobile network, the type of the mobile network, the identity of a network component performing the policy control, the type of implementation of the mobile videoconferencing application, the operational constraints on parameter choices within the mobile network, the mobile networks' ability to cover gaps in media delivery, the possible transcoding/transrating options for the media streams, the quality of service schemes supported by the mobile network, and the mobile network's ability to split the communication session over multiple communication paths.

Certain other such embodiments comprise, in response to determining that the mobile device is associated with the videoconferencing application, providing from the videoconferencing system in the fixed network to the mobile network a second set of indicators associated with the communication session, where the second set of indicators include an indication of at least one of: the use of interactive real-time media service, a videoconferencing service category, the type of videoconferencing service, the identity of a component within the videoconferencing system that is modifying signaling, the type of videoconferencing system implementation, the operational constraints on parameter choices within the videoconferencing system, the videoconferencing system's ability to cover gaps in media delivery, the video codec options supported by the videoconferencing system, and the constraints due to subscriber configuration of the videoconferencing system.

A second set of embodiments include logic encoded in one or more non-transient media that includes code for execution and when executed by a processor is operable to perform operations comprising any one or more of the above-described embodiments.

In a third set of embodiments, a system comprises a mobile gateway within a mobile network, the mobile network supporting a wireless communication session with a mobile device within the mobile network; and a media bridge, where the mobile gateway includes a first interface capable of receiving an indicator that the mobile device is using a mobile videoconferencing application, and a second interface to the media bridge, and where the mobile gateway is configured to, in response to receiving the indicator, cause a session bearer within the mobile network to be adjusted to meet a QoS requirement of a videoconferencing media stream connected to the mobile device, where the session bearer carries the videoconferencing media stream, and where the mobile gateway is configured to, in response to receiving the indicator, cause the media bridge to process the videoconferencing media stream using an operating mode that is different than an operating mode used for processing media streams for videoconferencing end points within the fixed network.

In certain embodiments of the third set of embodiments, the system further comprises a session border control in communication with the first interface and with a fixed network, the session border control configured to send the indicator to the first interface in response to the session border control determining, using deep packet inspection, that the mobile device is using a mobile videoconferencing application; the mobile gateway receives the indicator using one of a Session Description Protocol (SDP) 'servclass' attribute and an internet media services (IMS) P-Access-Network-Info header; the mobile gateway further includes a third interface to a videoconferencing call manager within a fixed network, the third interface configured to communicate information related to the communication session of the mobile videoconferencing mobile device, and where the mobile gateway is further configured to, in response to receiving the indicator, request that the call manager be configured for communicating with the mobile device, where the configuration is different from a configuration used by the call manager for communicating with a videoconferencing end point within the fixed network.

In some of this third set of embodiments, the mobile gateway is configured to send to the videoconferencing call manager a set of indicators, the set of indicators including at least one of: the association of the mobile device with a mobile videoconferencing application, the use by the mobile device of the mobile network, the type of the mobile network, the identity of a network component performing the policy control the type of implementation of the mobile videoconferencing application, the operational constraints on parameter choices within the mobile network, the mobile network's ability to cover gaps in media delivery, the possible transcoding/transrating options for the media streams, the quality of service schemes supported by the mobile network, and the mobile network's ability to split the communication session over multiple communication paths.

In a fourth set of embodiments, a method comprises: establishing a wireless communication session between a videoconferencing system within a fixed network and a mobile device in a mobile network, the videoconferencing system including a call manager capable of handling calls between videoconferencing end points, and a media bridge capable of providing multipoint communication between videoconferencing end points; receiving a notification that the mobile device is associated with a mobile videoconferencing application, wherein the videoconferencing application is capable of sending and receiving media streams; causing the call manager to switch from a base operating mode, configured for communications with the fixed switching videoconferencing end point, to a mobile operating mode for communications with the mobile videoconferencing application; and causing the media bridge to support a media stream for the mobile videoconferencing application and to switch from a base operating mode for communications with a fixed switching videoconferencing end point to the mobile operating mode for communications with the mobile videoconferencing application.

In certain embodiments of this fourth set of embodiments, the notification is provided using one of a Session Description Protocol (SDP) 'servclass' attribute and an Internet Media Services (IMS) P-Access-Network-Info header; the operating mode for communications with the mobile videoconferencing application includes causing the media bridge to enhance the perceived continuity of a data flow; determining that the mobile device is associated with a videoconferencing application is performed using deep packet inspection.

Some of the fourth set of embodiments further comprising providing from the videoconferencing system in the fixed network to the mobile network a set of indicators associated with the communication session, where the set of indicators include an indication of at least one of: the use of interactive real-time media service, a videoconferencing service category, the type of videoconferencing service, the identity of a component within the videoconferencing system that is modifying signaling, the type of videoconferencing system implementation, the operational constraints on parameter choices within the videoconferencing system, the videoconferencing system's ability to cover gaps in media delivery, the video codec options supported by the videoconferencing system, and the constraints due to subscriber configuration of the videoconferencing system.

A fifth set of embodiments include logic encoded in one or more non-transient media that includes code for execution and when executed by a processor is operable to perform operations comprising any one or more of the above-described embodiments.

In yet a sixth set of embodiments, a system comprises: a videoconferencing call manager within a fixed network, where the call manager is capable of handling calls between videoconferencing end points, and the fixed network is capable of supporting a communication session with a mobile device within a mobile network; and a media bridge capable of providing multipoint communication between videoconferencing end points, where the videoconferencing call manager includes a first interface capable of receiving a first indicator that the mobile device is using a mobile videoconferencing application, and a second interface to the media bridge, and where the videoconferencing call manager is configured to, in response to receiving the first indicator, switch from a base operating mode, for communications with a fixed switching videoconferencing end point, to a mobile operating mode for communications with the mobile videoconferencing application, and where the videoconferencing call manager is configured to, in response to receiving the first indicator, cause the media bridge to provide a videoconferencing media stream to the mobile videoconferencing application, using an operating mode that is different than an operating mode used for providing media streams for videoconferencing end points within the fixed network.

In certain embodiments of this sixth set of embodiments, the system further comprises a session border control in communication with the first interface and with a mobile network, the session border control configured to send the first indicator to the first interface in response to the session border control determining, using deep packet inspection, that the mobile device is using a mobile videoconferencing application.

In still other embodiments of this sixth set of embodiments, the call manager receives the first indicator using one of a Session Description Protocol (SDP) 'servclass' attribute and an internet media services (IMS) P-Access-Network-Info header; the call manager further includes a third interface to a mobile gateway within a mobile network, the third interface configured to communicate information related to the videoconferencing system, and where the call manager is configured to send to the mobile gateway a second indicator, the indicators comprising one of: the use of interactive real-time media service, a videoconferencing service category, the type of videoconferencing service, the identity of a component within the videoconferencing system that is modifying signaling, the type of videoconferencing system implementation, the operational constraints on parameter choices within the videoconferencing system, the videoconferencing system's ability to cover gaps in media delivery, the video codec options supported by the videoconferencing system, and the constraints due to subscriber configuration of the videoconferencing system; the first interface is also capable of receiving a second set of indicators, the second set of indicators including at least one of: the association of the mobile device with a mobile videoconferencing application, the use by the mobile device of the mobile network, the type of the mobile network, the identity of a network component performing the policy control the type of implementation of the mobile videoconferencing application, the operational constraints on parameter choices within the mobile network, the mobile network's ability to cover gaps in media delivery, the possible transcoding/transrating options for the media streams, the quality of service schemes supported by the mobile network, and the mobile network's ability to split the communication session over multiple communication paths.

DESCRIPTION OF EXAMPLE EMBODIMENTS

Challenges Presented by Mobile Environments

Mobile devices such as smartphones, tablet computers, and other intelligent mobile devices with audio, video, and data capabilities are increasingly being used by mobile workers. As noted above, there are numerous challenges to extending videoconferencing capabilities to such devices. These challenges include those associated with accommodating the differences between mobile wireless networks and fixed wireline access networks such as:

Technology Mobility: Mobile users move between multiple access technologies such as 2.5G (CDMA or GSM), 3G, 4G (LTE or WiMAX), Femto, and WiFi.

Device Mobility: Mobile users change cells within an access technology type, e.g. 4G.

User Mobility: Mobile users access services using different devices, and they port services among devices.

Link Bandwidth Variations: The instantaneous bandwidth delivered by the mobile network can fluctuate with a high degree of variability. This variation depends on number of parameters, such as radio coverage, access technology, type of radio bearer, and device capabilities. At the same time, the video portion of videoconferencing can be very demanding in terms of required bandwidth, as well as particularly sensitive to latency, jitter, and packet loss.

Device Capability and Limitations: Mobile devices are typically challenged both on battery life, processing capabilities, and screen sizes.

Economics: Unlike fixed line access, the shared radio resource at the macro cell site is an expensive medium to support the volume of data within video traffic. Moreover, the backhaul links have limited bandwidth. Meanwhile, the Service Providers search for ways to manage the video traffic over their wireless networks and make new business cases out of the video applications.

In addition, while many fixed videoconferencing systems may be Enterprise-hosted within a fixed Enterprise network, mobile devices may be hosted and operate within a Service Provider's network, outside of the Enterprise. This entails additional complexity in providing mobile videoconferencing, because Service Provider hosted mobile networks may be limited in terms of both the control mechanisms available to support videoconferencing, and the ability to modify existing network components. For example, the Service Provider may be a wireless phone provider whose network is not under the control of the Enterprise hosting the fixed videoconferencing system. Moreover, the Service Provider's wireless network may not have the ability to accommodate the media streams associated with the videoconferencing system in a manner capable of delivering the media streams associated with a videoconferencing system with sufficient quality of service. The following embodiments can help to extend fixed videoconferencing conference capabilities to mobile devices despite these challenges.

Mobile Videoconferencing Architectures

FIG. 1 illustrates a communication network including components that support interworking and interoperability between a fixed videoconferencing system and a mobile network in accordance with certain embodiments, including components involved in providing call service signaling, policy control, and media plane processing. Cisco TelePresence™ is one type of system that may be used to provide videoconferencing in some embodiments.

Shown within the mobile network 10 are <n> mobile devices 100(1) through 100(n), each having a videoconferencing application associated with each respective device, each participating in a communication session, and each of which communicate through wireless link 102 using radio access network (RAN) 105. RAN 105 is in communication with gateway 120 through one or more routers 122. Gateway 120 is also shown in communication with media interwork/bridge 130.

Gateway 120 can access and maintain information relating to the communication session, the subscriber, the RAN radio bearers, and the policies relating to the communication session. The gateway 120 may be used to provide various services to a mobile device and to implement the QoS on packet flows. Several of these functions are used in providing, for example, voice over IP (VoIP) routing and enhanced services, such as enhanced charging, stateful firewalls, traffic performance optimization (TPO). The communication networks also allow provision of applications such as VoIP, streaming video, streaming music, multi-user gaming, location based services, and a variety of content delivered to a mobile node. In addition, gateway 120 may be used to help implement mobile videoconferencing, as explained in additional detail below.

Also shown within the fixed network 20 shown in FIG. 1, videoconferencing end points such as videophone 162 and videoconferencing room controller 164 can communicate with media bridge 160. Videophone 162, videoconferencing room controller 164, and media bridge 160 are also in communication with call manager 150. Call manager 150 handles calls between videoconferencing and videoconferencing end points, as well as performing translation of H.323 traffic to and from SIP as needed. Media bridge 160 provides multi-point communication between videoconferencing end points. In addition to supporting modes of operation suitable for communicating with videoconferencing end points within the fixed network, call manager 150 and media bridge 160 are capable of modes of operations that are also suitable for communicating with mobile videoconferencing end points. These latter modes may, for example, be more tolerant of the possible gaps in communication, lower bandwidth, and decreased floor control capabilities of mobile devices than modes of operation directed at fixed videoconferencing end points.

Wireless Technologies for Use with Videoconferencing

The above architectures may be used to extend videoconferencing to mobile devices through any number of wireless network technologies. Wireless networks are telecommunications networks that use radio waves to carry information from one node in the network to one or more receiving nodes in the network. Wired communication can also be used in portions of a wireless network, such as between cells or access points. Cellular telephony is characterized by the use of radio cells that provide radio coverage for a geographic area, with multiple cells arranged to provide contiguous radio coverage over a larger area.

The first generation of wireless telephone technology used analog mobile phones in which analog information signals were transmitted. As technology progressed a second generation (2G) of wireless service was introduced. In 2G systems, digital information signals were used to modulate a carrier. These 2G technologies used time division multiplexed access (TDMA) or code division multiple access (CDMA) technologies to distinguish multiple users. Such networks that were upgraded to handle higher-speed packet data in networks referred to as 2.5G and 3G networks. The 3rd Generation Partnership Project (3GPP) and the 3rd Generation Partnership Project 2 (3GPP2) respectively developed the GSM/UMTS/HSDPA and cdmaOne/CDMA2000 technologies. The next evolution is 4G technology, which is referred to as long term evolution-system architecture evolution (LTE-SAE) and uses orthogonal frequency division multiple access (OFDMA) technology.

Other wireless protocols have also developed including WiFi, an implementation of various IEEE 802.11 protocols, WiMAX, an implementation of IEEE 802.16, and HiperMAN, which is based on an ETSI alternative to IEEE 802.16.

The Mobile Network

Although not shown on FIG. 1, the radio access network 105 of FIG. 1 can employ a number of radio access technologies such as a 1×RTT transceiver, a high-rate packet data (HRPD) transceiver, and an evolved high-rate packet data (eHRPD) transceiver, each of which can connect to access network 105 and are described below. Radio access network 105 may also be an Evolved UMTS Terrestrial Radio Access Network (E-UTRAN) to which is connected an LTE network radio network component such as an evolved Node B (eNodeB) transceiver. Other radio access technologies, such as WiFi, Femto, WiMAX, or any other radio spectrum technology may connect to the mobile network via an appropriate transceiver using a broadband or other access network.

The radio access network 105 communicates with gateway 120. Gateway 120 can implement a combination of functionalities (not shown) such as a packet data serving node (PDSN), a HRPD serving gateway (HSGW), and/or a serving gateway (SGW). In operation, the PDSN functionality can be used with 1×RTT, the HSGW functionality can be used with HRPD and eHRPD, and the SGW functionality can be used with the eNodeB. Though not shown on FIG. 1, the gateway 120 can comprise or communicate with an anchor gateway that can implement a packet data network gateway (PDN-GW) and a Home Agent (HA), and a mobility management entity (MME). On the access network side, the anchor gateway can also communicate with an evolved packet data gateway (ePDG) which provides connectivity to the WiFi/Femto/other transceiver. On the packet core side, the gateway 120 can communicate with the operator's IP service domain, the internet, and the IP multimedia subsystem (IMS). An authentication, authorization, and accounting (AAA) server/home subscriber server (HSS) can communicate with the gateway 120, the anchor gateway, or both.

A Home Subscriber Server (HSS) can be a master user database that supports IMS network entities that handle calls. The HSS stores subscription-related information (subscriber profiles), performs authentication and authorization of the user, and can provide information about the subscriber's location and IP information. The AAA server can provide authentication, access control, and accounting to the network. The authentication can involve verification of the subscriber, the access control can involve granting or denying access to specific services, and the accounting that can take place includes the tracking of the use of network resources by subscribers. Other servers, such as a Home Location Register (HLR) can be used in other embodiments. In certain embodiments, the AAA/HSS can communicate with the gateway 120 for charging purposes.

In an LTE communication network, gateway 120 can include a PDN gateway (PDN-GW), a serving gateway (SGW), an E-UTRAN (evolved-UMTS terrestrial radio access network), and a mobility management entity (MME). The evolved packet core (EPC) of an LTE communications network includes the MME, SGW and PDN-GW components. In some embodiments, one or more EPC components can be implemented on the same gateway or chassis as described below.

Still referring to FIG. 1, within the mobile network, the gateway 120 is in a user plane where it forwards and routes packets to and from the eNodeB and PDN-GW (not shown). The gateway 120 may also serve as a local mobility anchor for inter-eNodeB handover and mobility between 3GPP networks. The gateway 120 routes and forwards user data packets, while also acting as the mobility anchor for the user plane during inter-eNodeB handovers, and as an anchor for mobility between LTE and other 3GPP technologies (terminating the S4 interface and relaying the traffic between 2G/3G systems and PDN-GW). For idle state mobile devices (also known as user equipment devices (UEs)), the gateway 120 terminates the down link data path and triggers paging when down link data arrives for the mobile device. The gateway 120 manages and stores mobile device contexts, e.g., parameters of the IP bearer service and network internal routing information. The gateway 120 may also perform replication of the user traffic in case of lawful interception.

The PDN-GW includes an interface between the LTE network and other packet data networks, such as the Internet or SIP-based IMS networks (fixed and mobile). The PDN-GW serves as an anchor point for intra-3GPP network mobility, as well as mobility between 3GPP and non-3GPP networks. The PDN-GW acts as the Policy and Charging Enforcement Function (PCEF), which manages Quality of Service, online/offline flow-based charging data generation, deep-packet inspection, and lawful intercept. The PDN-GW provides connectivity to the mobile device to external packet data networks by being the point of exit and entry of traffic for the mobile device. A mobile device may have simultaneous connectivity with more than one PDN-GW for accessing multiple packet data networks. The PDN-GW performs policy enforcement, packet filtering for each user, charging support, lawful interception, and packet screening. The PDN-GW also provides an anchor for mobility between 3GPP and non-3GPP technologies such as WiMAX and 3GPP2 standards (CDMA 1× and EV-DO).

The MME resides in the EPC control plane and manages session states, authentication, paging, mobility with 3GPP 2G/3G nodes, roaming, and other bearer management functions. The MME can be a standalone element or integrated with other EPC elements, including the gateway 120, PDN-GW, and Release 8 Serving GPRS Support Node (SGSN). The MME can also be integrated with 2G/3G elements, such as the SGSN and GGSN. This integration is part of what enables mobility and session management interworking between 2G/3G and 4G mobile networks.

MME is a control-node for the LTE access network. The MME is responsible for mobile device tracking and paging procedures including retransmissions. MME handles the bearer activation/deactivation process and is also responsible for choosing the SGW for a mobile device during the initial attachment and at time of an intra-LTE handover. The MME also authenticates the user by interacting with the HSS. The MME also generates and allocates temporary identities to mobile devices and terminates Non-Access Stratum (NAS) signaling. The MME checks the authorization of the mobile device to camp on the Service Provider's Public Land Mobile Network (PLMN) and enforces mobile device roaming restrictions. The MME is the termination point in the network for ciphering/integrity protection for NAS signaling and handles the security key management. Lawful interception of signaling is also supported by the MME. The MME also provides the control plane function for mobility between LTE and 2G/3G access networks with the S3 interface terminating at the MME from the SGSN (not shown). The MME also terminates the S6a interface towards the home HSS for roaming mobile devices.

The ePDG is responsible for interworking between the EPC and fixed non-3GPP access technologies such as a WiFi, WiMAX, LTE metro, and femtocell access networks. The ePDG can use IPSec/IKEv2 to provide secure access to the EPC network. Optionally, the ePDG can use Proxy Mobile IPv6 (PMIPv6) to interact with the PDN-GW when the mobile subscriber is roaming in an untrusted non-3GPP system. The ePDG is involved in tunnel authentication and authorization, transport level packet marking in the uplink, policy enforcement of QoS based on information received via Authorization, Authentication, Accounting (AAA) infrastructure, lawful interception, and other functions.

Mobile Videoconferencing Network Operation

The operation of the architecture shown in FIG. 1 may be described in terms of the operation and interfacing between signaling/control, policy, and media-bearing planes in which the elements of this architecture exist.

Figure 2:
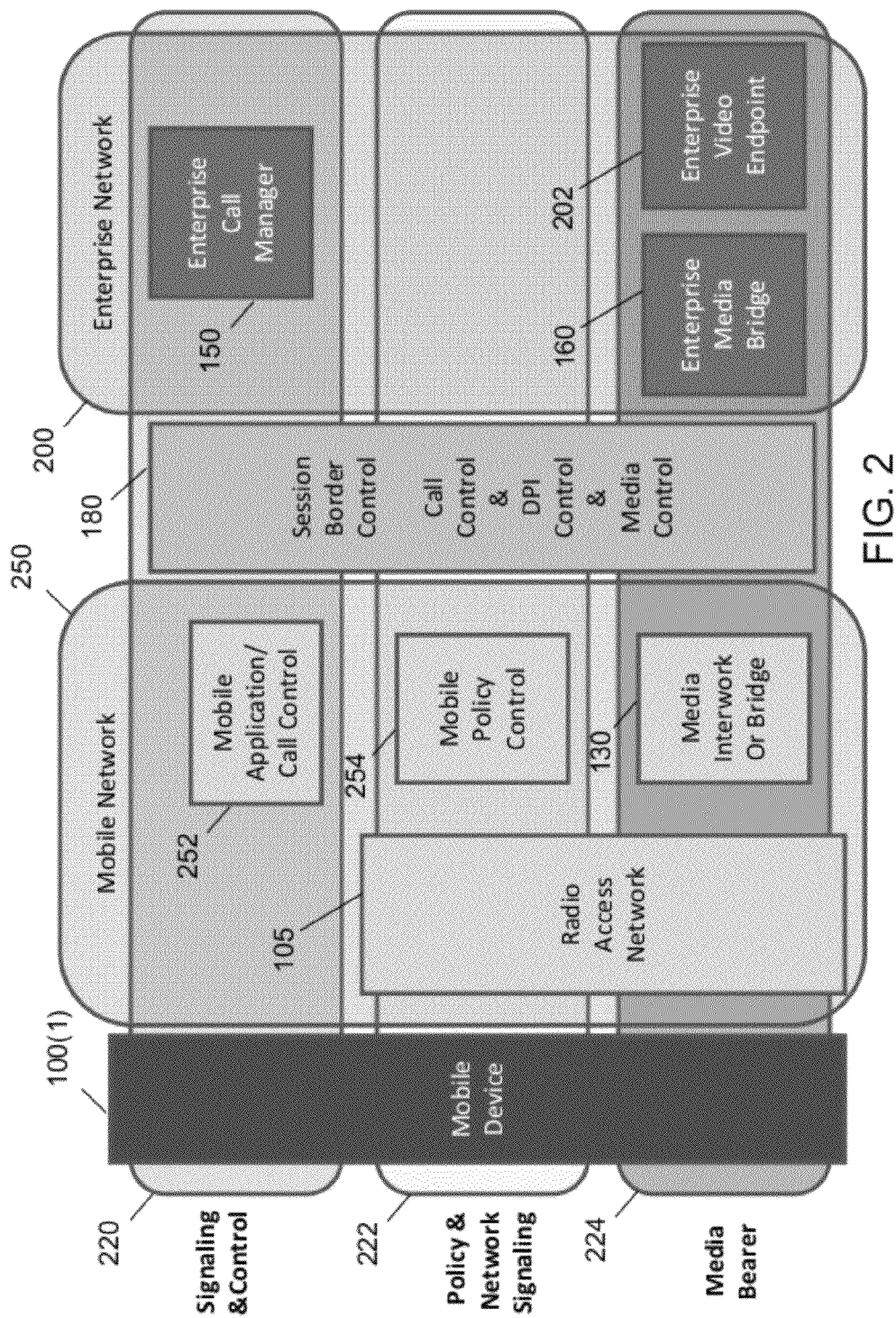
FIG. 2 illustrates network functions with respect to signaling, control and data planes in accordance with certain embodiments.

FIG. 2 shows the relationship between these planes and the elements and functions shown in FIG. 1. The correspondence between the functions in FIG. 2 and the elements of FIG. 1 that implement these functions are generally implementation dependent, and there may not be a one-to-one correspondence. In FIG. 2, Enterprise (fixed) network 200, session border control 180, mobile network 250, and mobile device 100(1) share three communication planes: signaling/control plane 220, policy/network signaling 222, and media bearer 244. Enterprise call manager 150 and mobile call control function 252 communicate along signaling/control plane 220. Mobile device 100(1) and session border control 180 communicate along all three types of planes, 220, 222, and 224. Radio access network 105 communicates along policy/network signaling plane 222, and media bearer 244. Mobile policy control 254 communicates along policy/network signaling plane 222. Media interwork/bridge 130, media bridge 160, and video end point 202 also communicate along media bearer plane 224. The operation of each of these signaling/control, policy, and media-bearing planes in embodiments of a mobile videoconferencing system, along with the network elements involved in each plane, are described below.

Signaling and Control Plane

The signaling/control plane 220 is responsible for how videoconferencing calls are managed, including registration, scheduling of calls, call setup, and call release.

Service Registration and Scheduling

Within signaling/control plane 220, fixed videoconferencing end points, e.g., videophone 162 and/or videoconferencing room controller 164, register to call manager 150 via SIP or H.323 protocols. In some embodiments, call manager 150 may be a Cisco Unified Communications Manager. Likewise, mobile IMS-based SIP end points (those that are capable of signaling to the mobile network using IMS-SIP), which can include devices 100(1)-100(n), will register to a P-CSCF and be served by an S-CSCF that has interfaces to application servers and registries providing call control features. The P-CSCF and S-CSCF may be implemented by gateway 120, which in some embodiments can be a Cisco ASR5000 gateway. There is also a Border GW Control Function (BGCF) that handles interaction with non-IMS SIP and other signaling systems. The BGCF may be implemented as part of the signaling aspect of border control element 180, or as part of gateway 120. This complex of functionality will just be collectively referred to as the IMS complex.

For videoconferencing calls involving IMS-based mobile end points, the call manager 150 may dial out to the IMS complex and have the dial plan provisioned to direct calls to the correct gateway. This same dial plan may also be used for audio-only dial-outs.

Session Control (SIP)

Referring to FIG. 2, in some embodiments, the IMS complex is a substitute on the mobile network for the interoperability call manager 150 that interacts with media bridge 160 within the fixed network. As such, the IMS complex supports similar interfaces to media interwork/bridge 130 as call manager 150 provides to media bridge 160. In some embodiments, interwork/bridge 130 may be a multipoint control unit such as a Cisco MXE5600. The SIP path for a videoconferencing session then has three segments: mobile device 100 to media interwork/bridge 130, media interwork/bridge 130 to enterprise media bridge 160, and enterprise media bridge 160 to a fixed videoconferencing endpoint (e.g. videophone 162 or videoconferencing room controller 164). However, because of the use of gateway 120 and call manager 150 as SIP proxies, the end-to-end SIP path may include:
1. Mobile device 100←→gateway 120, which may be implemented using IMS SIP, H.323, or an HTTP or RESTful (conforming to representational state transfer (REST)) interface,
2. Gateway 120←→media interwork/bridge 130,
3. Media interwork/bridge 130←→gateway 120←→enterprise call manager 150←→enterprise media bridge 160, and
4. Enterprise media bridge 160←→call manager 150←→fixed videoconferencing endpoint In addition, interworking is provided from the IMS-based SIP systems in the mobile network to the SIP Trunk specification used by the call manager 150. Various interworking specifications and/or methods can be used for this purpose, and several embodiments implementing such methods are described in more detail below. For example, the interworking can take advantage of the fact that most of the SIP headers will be the same in both the IMS-based system and the fixed videoconferencing system, and SIP rules are tolerant of extraneous optional headers that can be ignored if not required to be understood. Private header extensions to SIP (P-headers), such as the P-Access-Network-Info used in IMS, can thus be used to provide additional information to call manager 150, media bridge 160, and/or interwork/bridge 130, enabling these components to adapt behavior to accommodate the mobile end point. For example, call manager 150 may use similar P-headers to indicate to the IMS complex that the fixed-side SIP end points (such as call manager 150) are videoconferencing systems, and that one or more elements of the fixed videoconferencing environment should use modes of operation suitable for the mobile videoconferencing systems. Other methods to detect this are described below.

Session Description

The Session Description Protocol (SDP) is used with SIP to define each end point's media handling capabilities. An SDP Offer-Answer exchange narrows the set of media protocols down to the common set to be used on a specific call. Because media codecs are standardized as well as the SDP attributes describing their options, existing SDP media lines and attributes may be used. The IMS complex can use the SDP to identify that a call is a videoconferencing call and adjust the policy accordingly. For example, the attribute described in Internet Draft, "The Session Description Protocol (SDP) 'servclass' Attribute", draft-polk-mmusic-service-class-for-sdp-00 (possibly with the addition of further extensions) can provide an explicit indication of a videoconferencing service.

Policy Control

The policy/network signaling plane 222 is responsible for control and monitoring of networking and network policy. Policy control is provided within the mobile and fixed networks to:
- Use Policy and Charging Control (PCC) mechanisms to properly match the session bearers setup to meet the videoconferencing QoS requirements, and
- Provide or enhance continuity to the call leg during minor disruptions due to radio effects or handovers as the mobile user migrates.

Some of same network elements that have been developed for packet-based 4G mobile networks for setup of broadband connections may be used to provide policy control for mobile videoconferencing. For example, mobile policy control function 254 includes a Gx interface 257 to radio access network 105, along with an Rx interface 255 to mobile application control 252, and optionally an interface 259 to media interwork/bridge 130 to allow for control and shaping of media streams supplied to the mobile device. The Application Function (AF, aka the CSCF) can use the Rx interface to provide information to the Policy Control Resource Function (PCRF) about the requirements of the videoconferencing application. The PCRF in turn informs the mobile network components (those components embedding the Policy Control Enforcement Function (PCEF) via the Gx (or variant) interfaces) how to shape the media path session that traverses the mobile network routers.

Various encodings of the Rx and Gx interfaces may be used to support the communication of the videoconferencing-related policy parameters that shape the media path. Policy parameters and bandwidth considerations that may be supported and chosen to accommodate mobile videoconferencing include the following:
- Voice: The G.711 standard uses 64 kbps encoding, and the MPEG-4 Low Delay Audio Coder (AAC-LD) is compressed to 64 kbps.
- Video: CIF has a 768 kbps bit rate; and the H.264 video code at 720p has 1, 1.5 and 2.25 Mbps bit rates. These rates correspond to Good, Better, and Best motion handling, respectively.
- Full-duplex: The above are unidirectional measurements, so the target bandwidth may be double to accommodate both directions simultaneously.
- Packet Overhead: A general rule of thumb is to add 20% to the above rates to account for packet headers.
- Differentiated Services Code Points (DSCP): While traditional video conferencing uses AF4 class, videoconferencing may use the CS4 class for additional quality. For either class, a QoS with Guaranteed Bit Rate (GBR) is established having the ability to handle a 64 kbps burst per video screen feed.

Media Plane

This section addresses the various media types and the protocols used to deliver media through the mobile network to the end-user mobile device. The media plane can be described by the elements, codecs and protocols used within it.

Referring still to FIG. 2, in the media plane, media interwork/bridge 130 can be used to perform functions such as transcoding and gap-filling along the media bearer instead of or in addition to using enterprise media bridge 160 for these purposes. In this case, mobile policy control function 254 includes an interface (not shown) to interwork/bridge 130. Policy control function 254 controls interwork/bridge 130 to provide a media bearer to mobile device 100(1) using codecs that are appropriate for the mobile device's capabilities and available bandwidth. Either or both of the functions of mobile call control 252 and mobile policy control 254 may be implemented in a mobile gateway, such as gateway 120 in FIG. 1. A mobile indicator, such as the P-Access-Network-Info header, may also be sent to media bridge 160 to indicate that the bridge is to switch to an operating mode that is different than an operating mode the bridge would use for processing media streams for videoconferencing end points within the fixed network. For example, on receiving an indication that a mobile device is associated with a videoconferencing application, media bridge 160 may provide compensation for short temporary gaps in the RTP stream due to radio glitches or other interruptions.

Video Codecs

The H.264 family of standards may be within the media plane, and provides several possible resolutions and aspect ratios. Videoconferencing systems may utilize only a portion of these, such as using only the CIF and XGA with 4:3 ratio, or 720p and 1080p with 16:9 ratio. For mobile usage, these can further be narrowed down to a choice of CIF for non-native and 720p for native videoconferencing end points. Mobile videoconferencing may be implemented without the use of any new codecs.

Voice Codecs

Various voice codecs may be used in a mobile videoconferencing system. For example AAC-LD can be used for native videoconferencing end points, while G.711 is used for non-native end points.

Other Applications

Mobile videoconferencing may also make use of additional integrated collaborative feeds (requiring additional bandwidth for the screen images). As an alternative, separate collaborative systems may be used such as WebEx as a separate mobile application where the mobile users manually switches between applications as needed.

RTP

Standard RTP is delivered to/from the mobile end point. Native videoconferencing end points are expected to handle the context switching between multiple video feeds multiplexed into a single RTP stream. End points must support one video and one audio as separate RTP streams coming from the media interwork/bridge.

RTCP and Floor Control

The videoconferencing system may use special application packets for floor control, such as negotiating the number of screens and other capabilities of the videoconferencing end points. For example, in some systems, floor control may be achieved using in-band signals in the media plane via protocols that are native to the fixed videoconferencing system, such as Cisco's Videoconferencing Interoperability Protocol (TIP). The TIP protocol specifications describe how to multiplex multiple screens, multiple audio streams, as well as an auxiliary-data screen into a single Real-Time Transport Protocol (RTP) flows, one each for video and audio. It enables point to point and multipoint sessions as well as a mix of multi-screen and single-screen end points. The TIP protocol specification also defines how RTP Control Protocol (RTCP)-APP extensions are used to indicate profile capabilities and per media flow options as a session is established. It also defines how devices can provide feedback and trigger resiliency mechanisms during the life of the streams. For example, floor control enables the videoconferencing system to direct which end point sends video and what video feed displays on what screen. Since the mobile videoconferencing end point may use one screen, this may primarily involve knowing when to transmit video and knowing what video input is being displayed.

For non-native end points, media interwork/bridge 130 terminates the bearer on the mobile device side, and uses legacy signaling to control those end points. Interwork/bridge 130 terminates the media bearer on the fixed videoconferencing side as well. In this non-native scenario, interwork/bridge 130 may be controlled via an interoperability protocol such as TIP, and/or through out of band signals through an interface between the mobile policy control function 254.

The mobile videoconferencing scenarios described above may be implemented in at least the four embodiments described below, each of which enable automatic policy control handling by the mobile network of the videoconferencing video and audio streams.

Mobile Videoconferencing Using Over-the-top (OTT) Communication.

Figure 3:
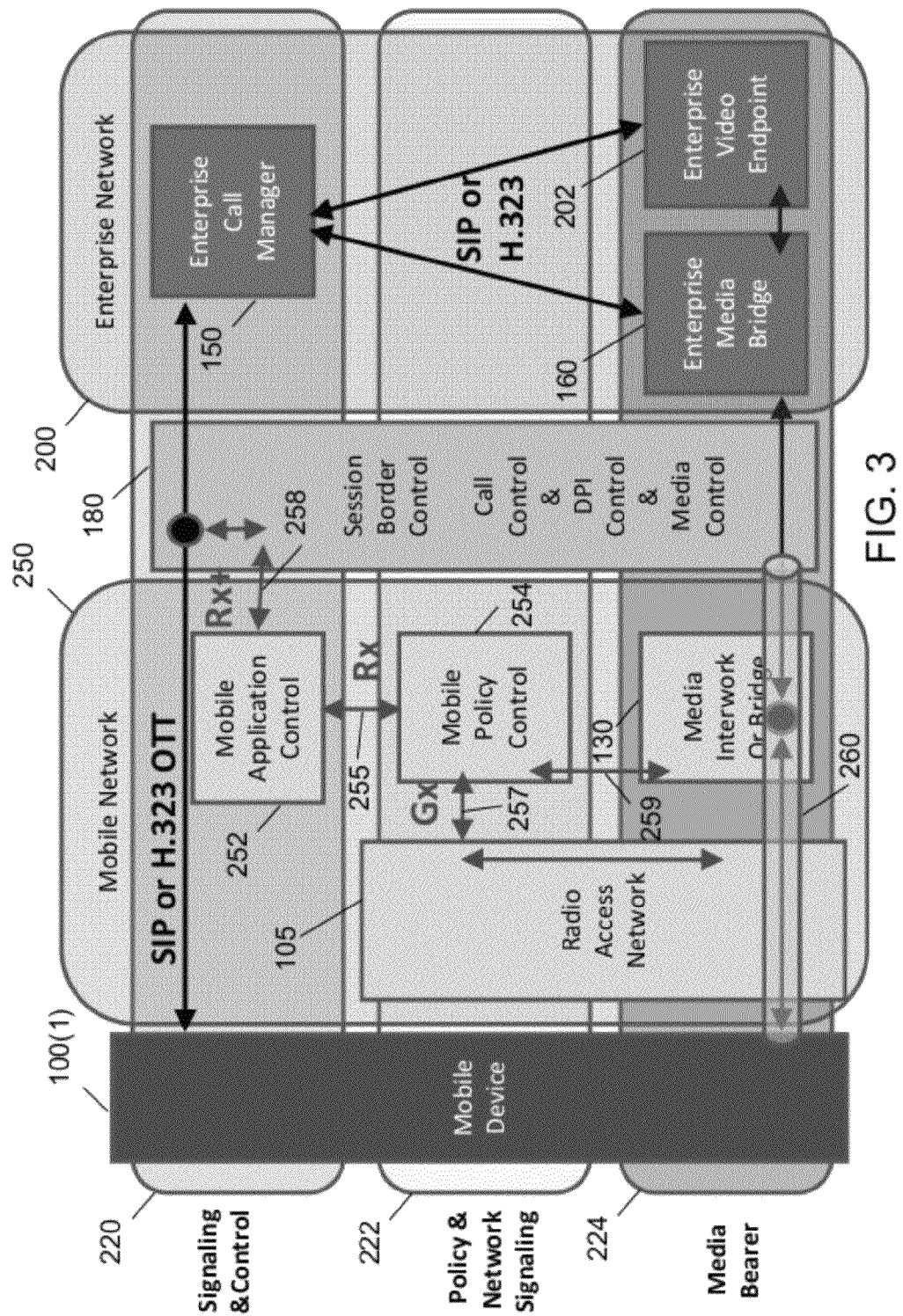
FIGS. 3-6 are flow diagrams showing operation of mobile videoconferencing in accordance with certain embodiments.

FIG. 3 shows a system using native videoconferencing mobile devices, e.g., devices specifically designed to work with the "native" protocols and interfaces of a particular videoconferencing system. In some embodiments, the mobile devices operate with an LTE mobile network provided by a Service Provider. Mobile device 100(1) communicates with videoconferencing call manager 150 "over the top" (OTT, or in band) of the underlying network connection using, for example, SIP or H.323-based messaging. That is, mobile device 100(1) uses the mobile network as a pipe to the fixed videoconferencing system, with videoconferencing-specific information being exchanged within that pipe. The mobile device does not need to directly interact with the underlying mobile network call service or policy signaling, nor use the mobile network to provide videoconferencing-specific provisioning and control.

In this embodiment, the Evolved Packet Core (EPC) of the mobile network (described above) uses Deep Packet Inspection (DPI) mechanisms to detect that a mobile using the LTE data service is using an OTT application to communicate directly to the primary videoconferencing call manager. Inspection of SIP, SDP, RTP, and/or RTCP streams allows the DPI to classify the application as a videoconferencing application. The DPI may be performed within either mobile call control function 252 (e.g., within gateway 120), media interwork/bridge 130, or at session border control 180. If session border control 180 performs the DPI, it can use interface 258 to inform the PCRF within the mobile network so that the PCRF can in turn use the Gx interface 257 to radio access network 105 to adjust the session bearers to accommodate the videoconferencing session. This scenario may require the user to have a service option in their profile so that the LTE network operator can be compensated by either the user or the videoconferencing system for the QoS used. Interface 258 may be an Rx interface, as described by 3GPP specification TS 29.211, possibly containing videoconferencing-specific additions. These additions are signified by "RX+" to indicate that while the types of information carried in this interface may have elements analogous to the 3GPP-defined Rx interface, they can also include additional elements, and as such, interface 258 may be considered a user-policy interface. Interface 258 may also be implemented using a custom interface, such as an HTTP-based SOAP interface, Web2.0, or REST technology as well as a DIAMETER-based protocol.

In both this embodiment and in the following three alternative embodiments, the operation of the videoconferencing system within the fixed network operates in much the same manner as it would without the additional mobile videoconferencing capabilities. Call manager 150 communicates with enterprise media bridge 160 and enterprise video end point 202 via SIP or H.323. Mobile videoconferencing end points appear to the fixed videoconferencing system as additional fixed video end points, albeit with characteristics such as floor control, coding, and availability that are particular to the mobile videoconferencing end point and operating environment. However, when mobile videoconferencing endpoints are involved, call manager 150 may be configured to operate in a mobile-specific mode that accommodates the mobile endpoints in addition to fixed endpoints. As part of this mode, call manager 150 may direct media bridge 160 to perform mobile-specific operations such as concealing radio packet loss (e.g., by injecting standby video on behalf of the mobile end point to enhance the perceived continuity of data flow) and/or otherwise keeping the call leg in service even during periods of packet loss, or to otherwise adapt behavior to accommodate the mobile end point.

Figure 4:
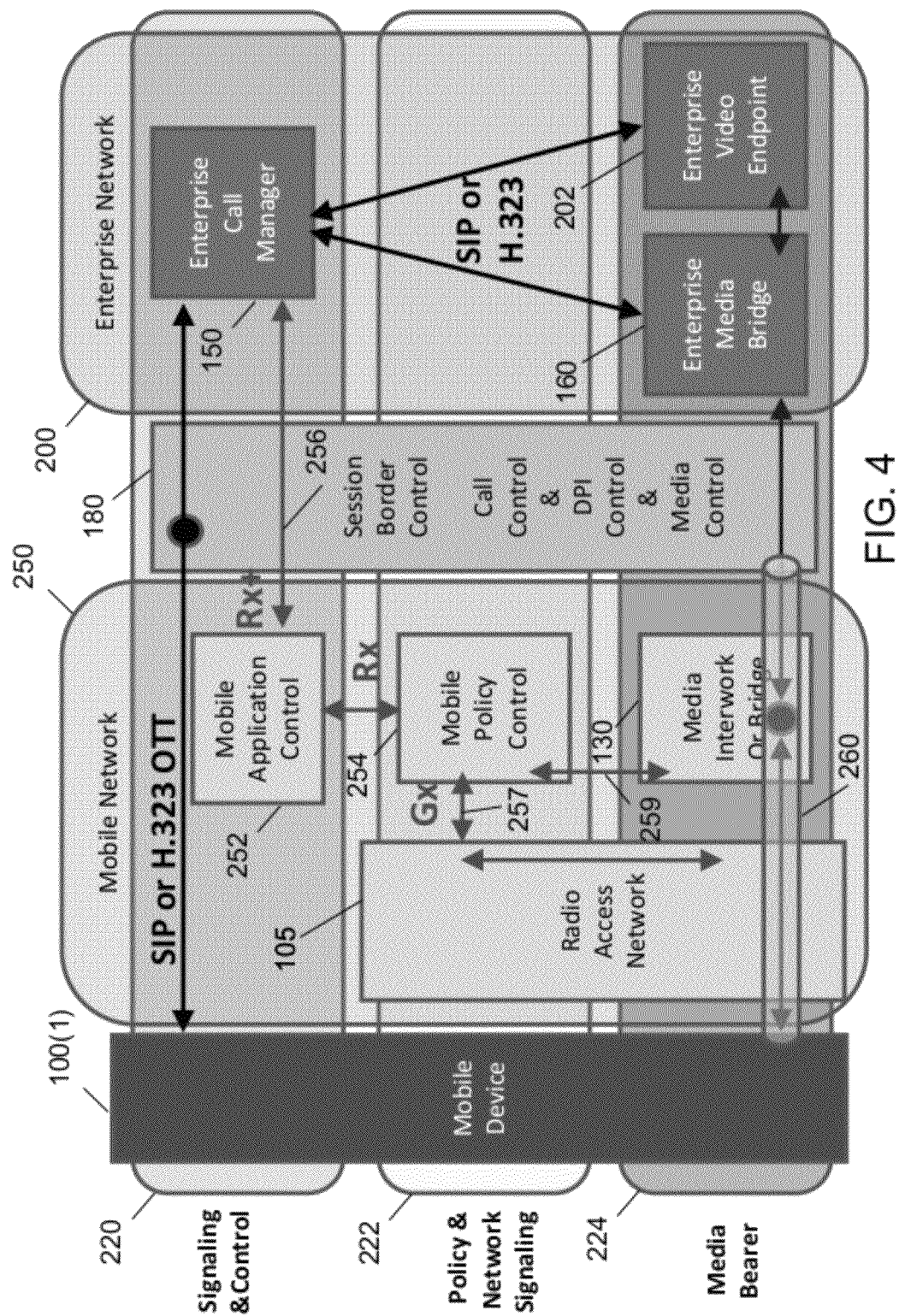

Mobile Videoconferencing Using Over-the-Top (OTT) and Videoconferencing-Specific Call Manager Interface FIG. 4 shows a variation of the mobile videoconferencing system shown in FIG. 3. In FIG. 4, session border control 180 detects a mobile videoconferencing end point through DPI as in FIG. 3. However, once this is detected and a corresponding indicator is sent to enterprise call manager 150, call manager 150 then communicates directly to the mobile application control 252 from that point forward through an interface such as RX+ interface 256. Similar to interface 258 on FIG. 3, interface 256 may be an Rx interface, as described by 3GPP specification TS 29.211, possibly containing videoconferencing-specific additions. Interface 256 may also be implemented using a custom interface, such as an HTTP-based SOAP interface.

Mobile Videoconferencing Using Mobile Service Provider Call Control

Figure 5:
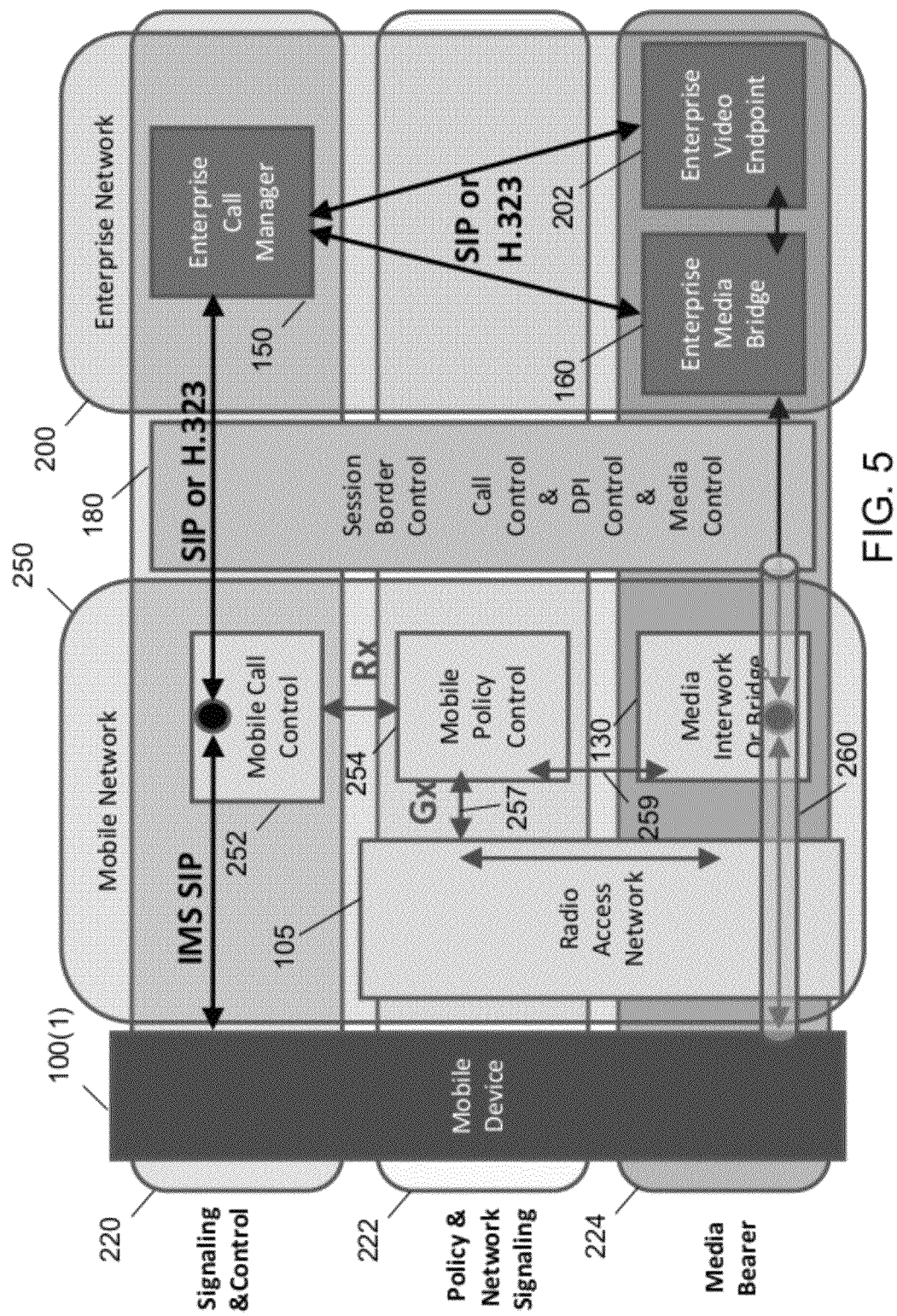

FIG. 5 shows a mobile videoconferencing system in which policy control is performed using IMS SIP signaling, and in which the mobile call control function 252 acts as an IMS SIP end point to perform both mobile application control (as in FIGS. 3-4), and mobile call control. In this embodiment, the videoconferencing-aware mobile 100 device interacts directly with the mobile network through IMS SIP messages. In turn, the mobile call control interworks with the fixed videoconferencing system via SIP or H.323. P-headers, such as the P-Access-Network-Info used in IMS and described in "Internet Engineering Task Force, RFC 3455-Private Header (P-Header) Extensions to the Session I" may be used to communicate information associated with mobile application and call control.

Figure 6:
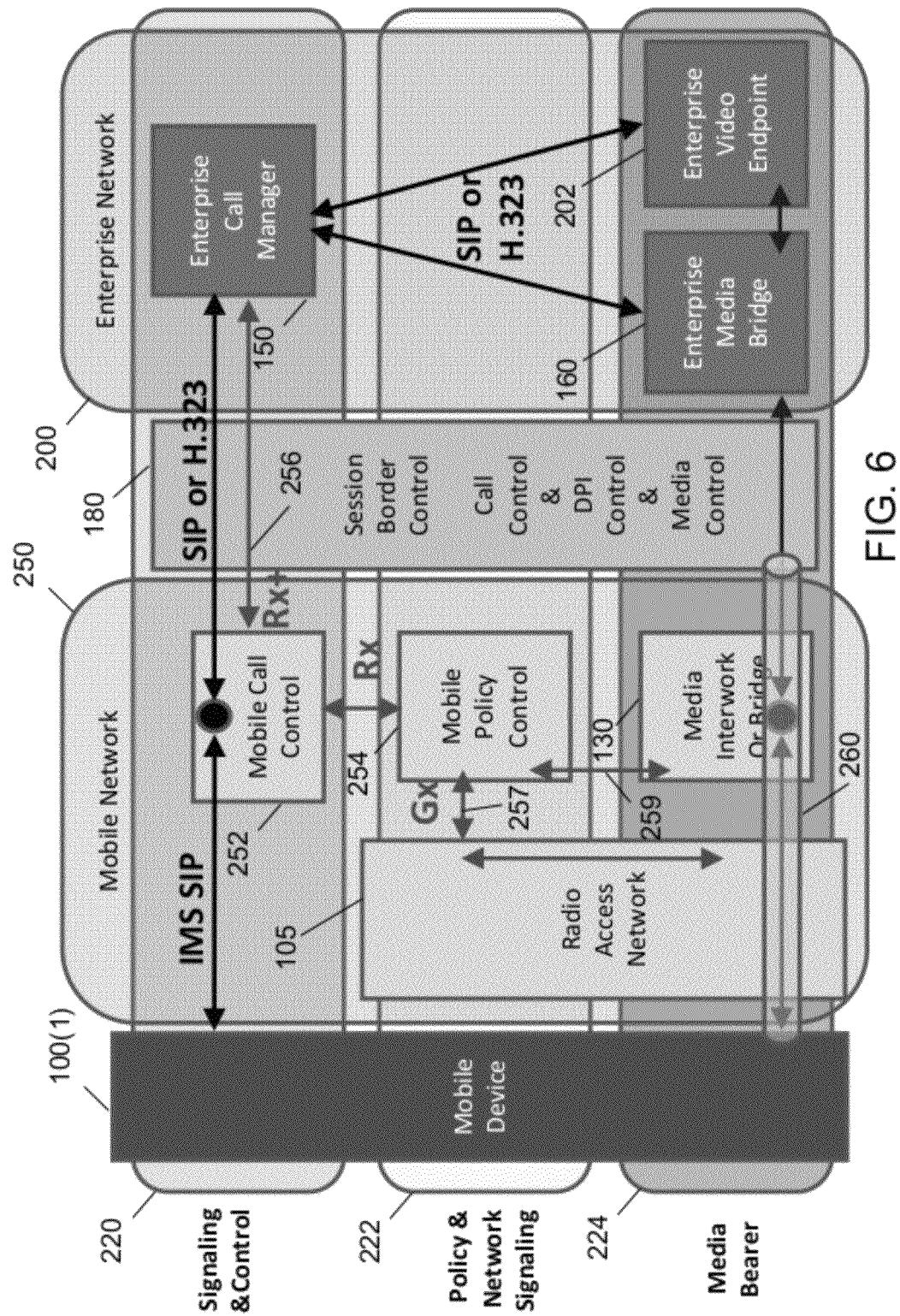

Mobile Videoconferencing Using Mobile Service Provider Call Control with Videoconferencing-Specific Call Manager Interface FIG. 6 shows a version of the system shown in FIG. 5 except that enterprise call manager 150 has an additional videoconferencing-specific interface 256 to mobile call control 252, and communicates directly through interface 256 to the mobile application control 252. As in the embodiment illustrated in FIG. 3, interface 256 may be implemented using a custom interface, such as an HTTP-based SOAP interface.

Legacy Video-Conferencing Using IMS-Based Mobile Devices

When using legacy IMS-based mobile devices, one or more elements of the IMS complex may be used to trigger policy controls based on monitoring the SIP/SDP traffic through the IMS core in order to apply the appropriate QoS to the session bearers.

Optionally, for either native videoconferencing or IMS-based legacy video-conferencing devices, a bearer optimization/improvement could be applied where the DPI monitors the session bearers 260 (RTP and RTCP streams) and adjusts the bandwidth provided to dynamically match the actual usage. When the mobile user is not the active speaker, the videoconferencing system can instruct the end point not to send video, thus only needing video sent from the MCU/CTMS to that mobile end point. This asymmetric use of video could allow the mobile network to temporarily give back bandwidth for other end points to use.

Information Exchange in a Mobile Videoconferencing System

Referring again to FIG. 3, the operation of mobile videoconferencing in the above embodiments can be described by the various types of indicators and other information that are exchanged as part of the interworking between components in the mobile network 250 and components within the fixed network 200. For example, information that may be communicated from the mobile network 250 to call manager 150 includes indications of:

1. The use of a mobile network
2. The type of network (3G, 4G, HSPA, Wimax, LTE etc.)
3. Which network component is modifying the signaling
4. The type of mobile implementation (e.g. vendor type)
5. Operational constraints on parameter choices (e.g. length of possible connection gaps during handovers)
6. Ability to cover gaps in media delivery (possible injection of alternate media if packet loss burst exceeds threshold of normal FEC schemes).
7. Possible transcoding/transrating options
8. QoS schemes supported
9. The ability to split sessions over multiple communication paths Information that may be communicated from call manager 150 to one or more elements of the mobile network (such as gateway 120) includes indications of:

1. Use of interactive real-time media service (e.g., video call versus video streaming)
2. Videoconferencing service category
3. Type of videoconferencing service (e.g., technology base: H.323, SIP variants, etc.)
4. What videoconferencing component modified signaling
5. Type of videoconferencing implementation (e.g. vendor type: Cisco/Tandberg, Polycom, etc.)
6. Operational constraints on parameter choices (e.g., length of time call leg considered valid before disconnect by bridge)
7. Ability to cover gaps in media delivery (including possible injection of alternate media if packet loss burst exceeds threshold of normal FEC schemes).
8. Supported video codec options
9. Constraints due to subscriber configuration Service Provider-Hosted and Enterprise-Hosted Solutions The mobile videoconferencing embodiments described above may be implemented in different ways depending on whether the overall videoconferencing system is Enterprise hosted and/or Service Provider hosted. Enterprise-hosted systems include those where the mobile network and the fixed videoconferencing system are controlled by the same entity that is making use of the system, such as the case where a corporation hosts a videoconferencing system within a fixed network as well as supporting mobile employees through a wireless network. Service Provider-hosted systems include those where the mobile network (and possibly the fixed videoconferencing system) is provided by one entity as a capability for other entities to use, such as the case where a corporation's employees use a mix of cellular wireless services from a Service Provider to access the corporation's fixed network. With some variations, mobile videoconferencing can be provided using the above-described embodiments both for scenarios in which all domains (mobile customer domain, RAN, SIP Core Network, and the fixed videoconferencing service domain) are Enterprise-hosted as well as for scenarios in which the mobile network is Service Provider hosted. Enterprise-hosted solutions may typically use WiFi within the mobile network, while Service Provider-hosted solutions could use LTE, WiMax, or WiFi.

Service Provider Hosted

This section describes the configuration of each domain in a videoconferencing solution where all domains are managed by a Service Provider, including the videoconferencing domain, which the Service Provider operates as a managed service. Within the customer domain, the user device performs service discovery, network authentication and registration per existing LTE network design. The mobile videoconferencing SIP client complies with EPC IMS based designs, while the SIP client may be enhanced with mobile videoconferencing capabilities. Within the customer (mobile end-user) domain:

The mobile videoconferencing application supports mobile videoconferencing enhancements for floor control The mobile videoconferencing application supports media presentation context handling, which may include at least 1 video, 1 audio, and 1 application media stream.

Within the radio domain,

Network SIP application functions (e.g. P-CSCF) in the access network may detect videoconferencing through examination of the SIP headers or through SDP capabilities.

The media interwork/bridge 130 (or other data plane gateway) may detect the existence of videoconferencing in the RTP/RTCP streams through DPI and notify the policy decision function. The DPI can be performed "in-box" in media interwork/bridge 130, or through "bump-in-wire" processing in session border controller 180. The bump-in-wire approach could also be implemented in router 122 (for example, using a Cisco ASR 1000 series aggregation services router), or in a service control engine or other DPI solution.

Policy decision and enforcement elements adapt the session characteristics to handle the videoconferencing media flows.

Existing accounting components reflect the current access network usage for videoconferencing sessions. For example, the signaling used to setup the call may also be used in Gy and Gz flows to account for the delivered capability used by the videoconferencing session, both for on-line (pre-paid) and off-line (post-paid) capabilities.

Within the EPC domain,

SIP application functions (e.g. S-CSCF) in the EPC network detects videoconferencing through examination of the SIP headers or SDP capabilities.

The media interwork/bridge 130 handles the existence of multiple videoconferencing media flows within the RTP/RTCP streams coming from the videoconferencing Service domain.

The media interwork/bridge 130 transrates, transcodes, or otherwise filters media streams down to the maximum level supportable by the radio network and the customer device, which could be a maximum of 1 audio and 1 video stream.

The media interwork/bridge 130 handles the videoconferencing media flows coming from the radio network and interworks them with the corresponding media for the videoconferencing service domain.

If enterprise media bridge 160 is unable to conceal radio packet loss, the media interwork/bridge 130 may inject "standby" RTP video during gaps in RTP streams for limited periods of time.

Policy decision elements in the EPC mediate between the radio domain reported capabilities and the selection of the session characteristics to be used by the media interwork/bridge 130 on the radio domain side.

Existing accounting components reflect the current access network usage for videoconferencing sessions. For example, the signaling used to setup the call may also be used in Gy and Gz flows to account for the delivered capability used by the videoconferencing session, both for on-line (pre-paid) and off-line (post-paid) capabilities.

Within the fixed videoconferencing domain,

The videoconferencing service domain may detect from the P-headers in the SIP headers that the user device is in a mobile domain and thus not interpret packet loss as congestion. This may include keeping the call leg in service even during periods of packet loss, which may be handled by media bridge 160.

The videoconferencing service domain otherwise operates per normal, fixed videoconferencing service designs.

The videoconferencing session setup functions may recognize the maximum capabilities of the user device from the terminated SDP and provide only a limited set of media streams toward that mobile leg of the videoconferencing call.

Handling of Policy Control between the EPC and the videoconferencing domain may be manually or automatically provisioned and controlled.

Media flows of existing fixed videoconferencing systems may be used in the mobile videoconferencing environment.

Enterprise Hosted

This section describes the configuration of each domain in a videoconferencing solution where all domains are managed by the Enterprise. In this case, within the customer domain, The user device is provisioned to access the videoconferencing system through its home SIP Proxy.

The SIP client complies with Enterprise SIP-based designs, i.e. registers to the enterprise call manager 150 of the fixed videoconferencing system. The SIP client may be enhanced with mobile videoconferencing capabilities.

The mobile videoconferencing application may support mobile videoconferencing enhancements for floor control.

The mobile videoconferencing application supports media presentation context handling, which may include at least 1 video, 1 audio, and 1 application media stream.

Within the radio domain,

No SIP application function exists in the radio access network.

The WiFi network may not be required to handle videoconferencing-specific functions. However, the client may generate RTP traffic using DSCP codes (CS4) whose presence can indicate a videoconferencing-type service and thus get better than best-effort service on the intranet.

Policy decision and enforcement elements may be engaged as a result of DPI.

Existing accounting components may be used.

The SIP domain and the videoconferencing domain are integrated, e.g., enterprise call manager 150 may be considered part of the mobile videoconferencing solution.

Within the SIP/videoconferencing domain,

SIP application function (e.g. enterprise call manager 150) can recognize that a videoconferencing call is coming from a mobile domain through examination of the SIP headers or SDP capabilities, either or both of which may be inserted by the mobile devices.

The videoconferencing session may be routed through a mobile enhanced data plane gateway such as media interwork/bridge 130 in order to handle the existence of multiple videoconferencing media flows within the RTP/RTCP streams coming from the fixed videoconferencing Service domain. The media streams may be handled by any combination of media interwork/bridge 130, enterprise media bridge 160, or other video conferencing unit.

The media interwork/bridge 130 transrates, transcodes, or otherwise filters media streams down to the maximum level supportable by the radio network and the customer device, which could be a maximum of 1 audio and 1 video stream.

The media interwork/bridge 130 handles the videoconferencing media flows coming from the radio network and interworks them with the corresponding media for the videoconferencing service domain.

Accounting components in the Enterprise SIP domain are per normal videoconferencing designs.

The videoconferencing service domain may have limited knowledge that the user device is in a mobile domain and otherwise operates per normal fixed videoconferencing service designs.

The videoconferencing session setup functions may recognize the maximum capabilities of the user device from the terminated SDP and provide only a limited set of media streams toward that mobile leg of the video conferencing call.

Media flows of existing fixed videoconferencing systems may be used in the mobile videoconferencing environment.

Mobile Devices

The mobile devices described earlier can communicate with a plurality of radio access networks using a plurality of access technologies, and possibly in combination with wired communication networks. The mobile device can be a smartphone offering advanced capabilities such as word processing, web browsing, gaming, e-book capabilities, an operating system, and a full keyboard. The mobile device may run an operating system such as Symbian OS, iPhone OS, RIM's Blackberry, Windows Mobile, Linux, Palm WebOS, and Android. The screen may be a touch screen that can be used to input data to the mobile device, and the screen may be used instead of the full keyboard. The mobile device may have the capability to run applications or communicate with applications that are provided by servers in the communication network. The mobile device can receive updates and other information from these applications on the network.

The mobile device also encompasses many other devices such as personal televisions (TVs), video projectors, set-top boxes or set-top units, digital video recorders (DVR), computers, netbooks, laptops, and any other audio/visual equipment that can communicate with a network. The mobile device could also be a remotely controlled, self-propelled robot that functions as a sort of avatar to project the virtual presence of a person from one location to another. The robot can carry a video screen showing the face of the remote operator, along with microphones and cameras and speakers to allow people in the robot's environment to interact with the robot in a similar fashion to how they might interact with the operator if he or she were present. The mobile device can also keep global positioning coordinates, profile information, or other location information in its stack or memory. The mobile device can have a memory such as a computer readable medium, flash memory, a magnetic disk drive, an optical drive, a programmable read-only memory (PROM), and/or a read-only memory (ROM). The mobile device can be configured with one or more processors that process instructions and run software that may be stored in memory. The processor can also communicate with the memory and interfaces to communicate with other devices. The processor can be any applicable processor such as a system-on-a-chip that combines a CPU, an application processor, and flash memory. The interfaces can be implemented in hardware or software. The interfaces can be used to receive both data and control information from the network as well as local sources, such as a remote control to a television. The mobile device can also provide a variety of user interfaces such as a keyboard, one or more still or video cameras, a touch screen, a trackball, a touch pad, and/or a mouse. The mobile device may also include speakers and a display device in some embodiments.

Mobile Gateway

The gateway 120 described above can be implemented in a network device in some embodiments. This network device can implement multiple and different integrated functionalities. In some embodiments, one or more of the following functionalities (not shown in the figures referenced above) can be implemented on the network device including a security gateway (SeGW), an access gateway, a Gateway General packet radio service Serving Node (GGSN), a serving GPRS support node (SGSN), a packet data inter-working function (PDIF), an access service network gateway (ASNGW), a User Plane Entity (UPE), an IP Gateway, a session initiation protocol (SIP) server, a proxy-call session control function (P-CSCF), and an interrogating-call session control function (I-CSCF), a serving gateway (SGW), and a packet data network gateway (PDN GW), a mobility management entity (MME), a mobility access gateway (MAG), an HRPD serving gateway (HSGW), a local mobility anchor (LMA), a packet data serving node (PDSN), a foreign agent (FA), and/or home agent (HA).

In certain embodiments, the functionalities are provided by a combination of hardware and software in the network device. General purpose hardware can be configured in the network device to provide one or more of these specialized functionalities. The gateway can also support sessions originated from a Femto base station, which would connect to the gateway using a broadband network. A person or corporation may use a Femto base station in a home or business to support one or more mobile nodes. The gateway can provide trigger based traffic management during a handoff from a Femto base station to a macro base station, while maintain traffic management for the mobile node. The offload gateway can be implemented as any combination of the following including an xGSN, an xGW, an xGW-SGW, and an xGW-PGW.

Referring to FIG. 1, gateway 120 can implement a number of functions specific to mobile videoconferencing. These include:

Interworking IMS SIP to videoconferencing SIP Trunk: The gateway supports the SIP Trunk so that it can play the role of the interoperability call manager within the mobile domain.

Interface to media interwork/bridge 130: Gateway 120 is configured to interact with a media interwork/bridge 130 such as a multipoint control unit (MCU) of the interoperability solution.

MCU substitute: Gateway 120 may alternatively incorporate the subset of the MCU functionality needed to support SIP-only end points. These end points may support IMS-based SIP or generic SIP-based video end points.

Policy support: If a PCRF external to gateway 120 is used, the gateway 120 acts as an application function, and supports the Rx interface to the PCRF, possibly with policy additions for videoconferencing.

PCRF support: If the gateway 120 uses an internal PCRF, it may support Gx interface policy additions for videoconferencing.

Mobile connectivity cover: Gateway 120 may "loop" the video feed for short periods to address handover and radio glitches. This may be implemented as an alternate "ghost" active speaker that stands in for the mobile device that is temporarily out of radio contact.

Figure 7:
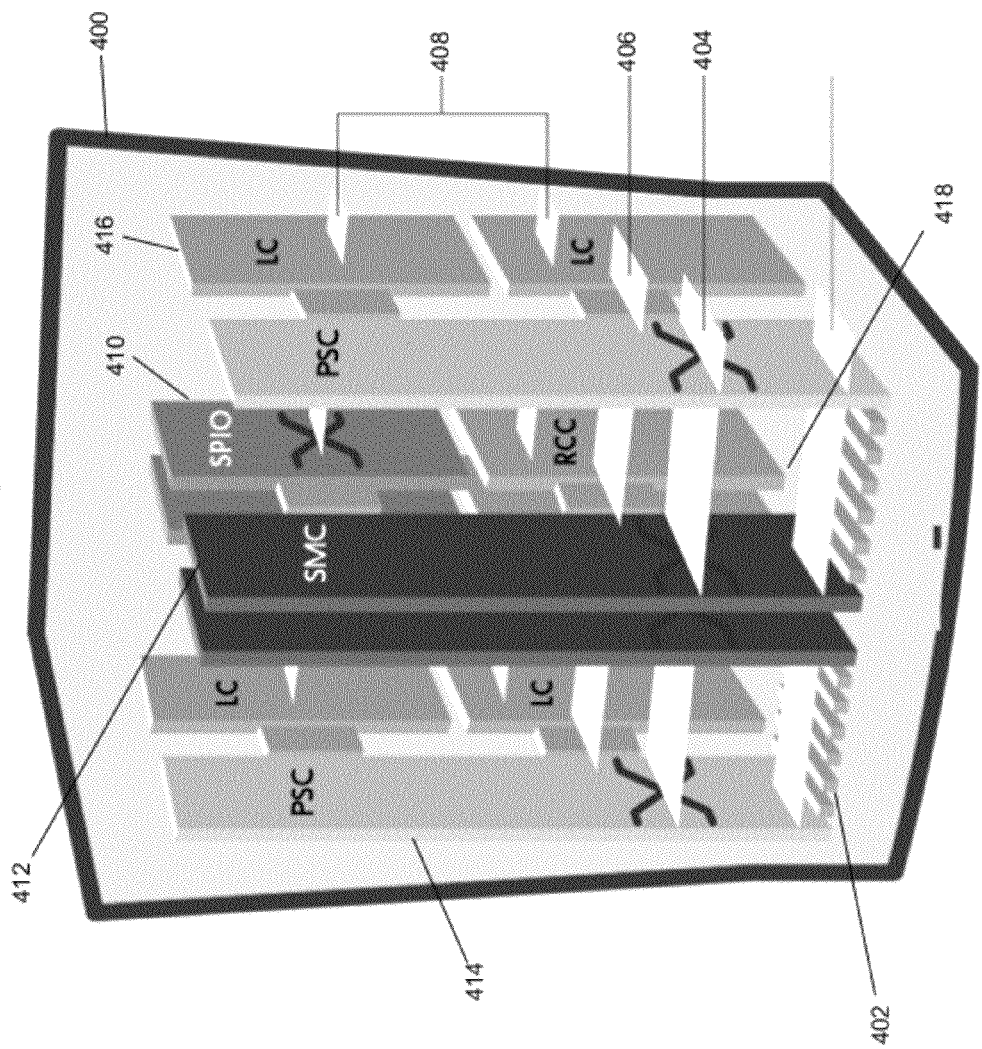
FIG. 7 illustrates a videoconferencing gateway in accordance with certain embodiments.

In some embodiments, gateway 120 is implemented using a collection of integrated circuit boards or cards. These cards include input/output interfaces for communication amongst each other, at least one processor for executing instructions and running modules that are stored in memory, and memory for storing data. The features of a network device that can implement a gateway, in accordance with some embodiments, are further described below. FIG. 7 illustrates the implementation of a network device in accordance with some embodiments. The network device 400 includes slots 402 for loading application cards and line cards. A midplane can be used in the network device to provide intra-network device communications, power connections, and transport paths between the various installed cards. The midplane can include buses such as a switch fabric 404, a control bus 406, a system management bus, a redundancy bus 408, and a time division multiplex (TDM) bus. The switch fabric 404 is an IP-based transport path for user data throughout the network device implemented by establishing inter-card communications between application cards and line cards. The control bus 406 interconnects the control and management processors within the network device. The network device management bus provides management of system functions such as supplying power, monitoring temperatures, board status, data path errors, card resets, and other failover features. The redundancy bus 408 provides transportation of user data and redundancy links in the event of hardware failures. The TDM bus provides support for voice services on the system.

The network device supports at least four types of application cards: a switch processor I/O card (SPIO) 410, a system management card (SMC) 412, a packet service card (PSC) 414, and a packet accelerator card (not shown). Other cards used in the network device include line cards 466 and redundant crossbar cards (RCC) 418. The line cards 416, when loaded in the network device, provide input/output connectivity to the network and other devices, as well as redundancy connections. The line cards 416 include interfaces to the network through Ethernet, Fiber Optic, and the other communication mediums. The redundant crossbar card (RCC) 418 includes a non-blocking crossbar and connections to each of the cards in the network device. This allows a redundant connection to be made through the redundant crossbar card 418 from any one card to any other card in the network device. The SPIO card 410 serves as a controller of the network device and is responsible for such things as initializing the network device and loading software configurations onto other cards in the network device.

The system management card (SMC) 412 and switch processor card (not shown) are system control and management cards for managing and controlling other cards in the network device. The packet accelerator card (PAC) and packet service card (PSC) 414 provide packet processing, context processing capabilities, and forwarding capabilities among other things. The PAC and PSC 414 perform packet-processing operations through the use of control processors and a network processing unit. The network processing unit determines packet processing requirements; receives and transmits user data frames to/from various physical interfaces; makes IP forwarding decisions; implements packet filtering, flow insertion, deletion, and modification; performs traffic management and traffic engineering; modifies/adds/strips packet headers; and/or manages line card ports and internal packet transportation. The control processors, also located on the packet accelerator card, provide packet-based user service processing.

The operating system software can be based on a Linux software kernel and run specific applications in the network device such as monitoring tasks and providing protocol stacks. The software allows network device resources to be allocated separately for control and data paths. For example, certain packet accelerator cards and packet services cards can be dedicated to performing routing or security control functions, while other packet accelerator cards/packet services cards are dedicated to processing user session traffic. As network requirements change, hardware resources can be dynamically deployed to meet the requirements in some embodiments. The system can be virtualized to support multiple logical instances of services, such as technology functions (e.g., a SeGW PGW, SGW, MME, HSGW, PDSN, ASNGW, PDIF, HA, or GGSN).

The network device's software can be divided into a series of tasks that perform specific functions. These tasks communicate with each other as needed to share control and data information throughout the network device. A task is a software process that performs a specific function related to system control or session processing. Three types of tasks operate within the network device in some embodiments: critical tasks, controller tasks, and manager tasks. The critical tasks control functions that relate to the network device's ability to process calls such as network device initialization, error detection, and recovery tasks. The controller tasks mask the distributed nature of the software from the user and perform tasks such as monitor the state of subordinate manager(s), provide for intra-manager communication within the same subsystem, and enable inter-subsystem communication by communicating with controller(s) belonging to other subsystems. The manager tasks can control system resources and maintain logical mappings between system resources.

Individual tasks that run on processors in the application cards can be divided into subsystems. A subsystem is a software element that either performs a specific task or is a culmination of multiple other tasks. A single subsystem can include critical tasks, controller tasks, and manager tasks. Some of the subsystems that can run on a network device include a system initiation task subsystem, a high availability task subsystem, a recovery control task subsystem, a shared configuration task subsystem, a resource management subsystem, a virtual private network subsystem, a network processing unit subsystem, a card/slot/port subsystem, and a session subsystem.

The system initiation task subsystem is responsible for starting a set of initial tasks at system startup and providing individual tasks as needed. The high availability task subsystem works in conjunction with the recovery control task subsystem to maintain the operational state of the network device by monitoring the various software and hardware components of the network device. Recovery control task subsystem is responsible for executing a recovery action for failures that occur in the network device and receives recovery actions from the high availability task subsystem. Processing tasks are distributed into multiple instances running in parallel so if an unrecoverable software fault occurs, the entire processing capabilities for that task are not lost. User session processes can be sub-grouped into collections of sessions so that if a problem is encountered in one sub-group, users in another sub-group will not be affected by that problem.

The architecture also allows check-pointing of processes, which is a mechanism to protect the system against any critical software processes that may fail. The self-healing attributes of the software architecture protects the system by anticipating failures and instantly spawning mirror processes locally or across card boundaries to continue the operation with little or no disruption of service. This unique architecture allows the system to perform at the highest level of resiliency and protects the user's data sessions while ensuring complete accounting data integrity.

Shared configuration task subsystem provides the network device with an ability to set, retrieve, and receive notification of network device configuration parameter changes and is responsible for storing configuration data for the applications running within the network device. A resource management subsystem is responsible for assigning resources (e.g., processor and memory capabilities) to tasks and for monitoring the task's use of the resources.

Virtual private network (VPN) subsystem manages the administrative and operational aspects of VPN-related entities in the network device, which include creating separate VPN contexts, starting IP services within a VPN context, managing IP pools and subscriber IP addresses, and distributing the IP flow information within a VPN context. In some embodiments, within the network device, IP operations are done within specific VPN contexts. The network processing unit subsystem is responsible for many of the functions listed above for the network processing unit. The card/slot/port subsystem is responsible for coordinating the events that occur relating to card activity such as discovery and configuration of ports on newly inserted cards and determining how line cards map to application cards.

The session subsystem is responsible for processing and monitoring a mobile subscriber's data flows in some embodiments. Session processing tasks for mobile data communications include: S1/S5/S8 interface termination for LTE networks, A10/A11 interface termination for CDMA networks, GSM tunneling protocol (GTP) termination for GPRS and/or UMTS networks, asynchronous PPP processing, IPsec, packet filtering, packet scheduling, Diffserv codepoint marking, statistics gathering, IP forwarding, and AAA services, for example. Responsibility for each of these items can be distributed across subordinate tasks (called managers) to provide for more efficient processing and greater redundancy. A separate session controller task serves as an integrated control node to regulate and monitor the managers and to communicate with the other active subsystem. The session subsystem also manages specialized user data processing such as payload transformation, filtering, statistics collection, policing, and scheduling.

In providing emulation, as MIPv4 is received from a mobile node, the session subsystem can setup a MIPv4 termination and setup a PMIPv6 session towards the core network. A session manager can track the mapping of the sessions and processing to provide the emulation and interworking between the networks. A database can also be used to map information between the sessions, and store, for example, NAI, HoA, AE information in some embodiments.

The network device allows system resources to be allocated separately for control and data paths. For example, certain PACs/PSCs could be dedicated to performing routing or security control functions while other PACs/PSCs are dedicated to processing user session traffic. As network requirements grow and call models change, hardware resources can be added to accommodate processes, such as encryption, packet filtering, etc., that require more processing power.

Figure 8:
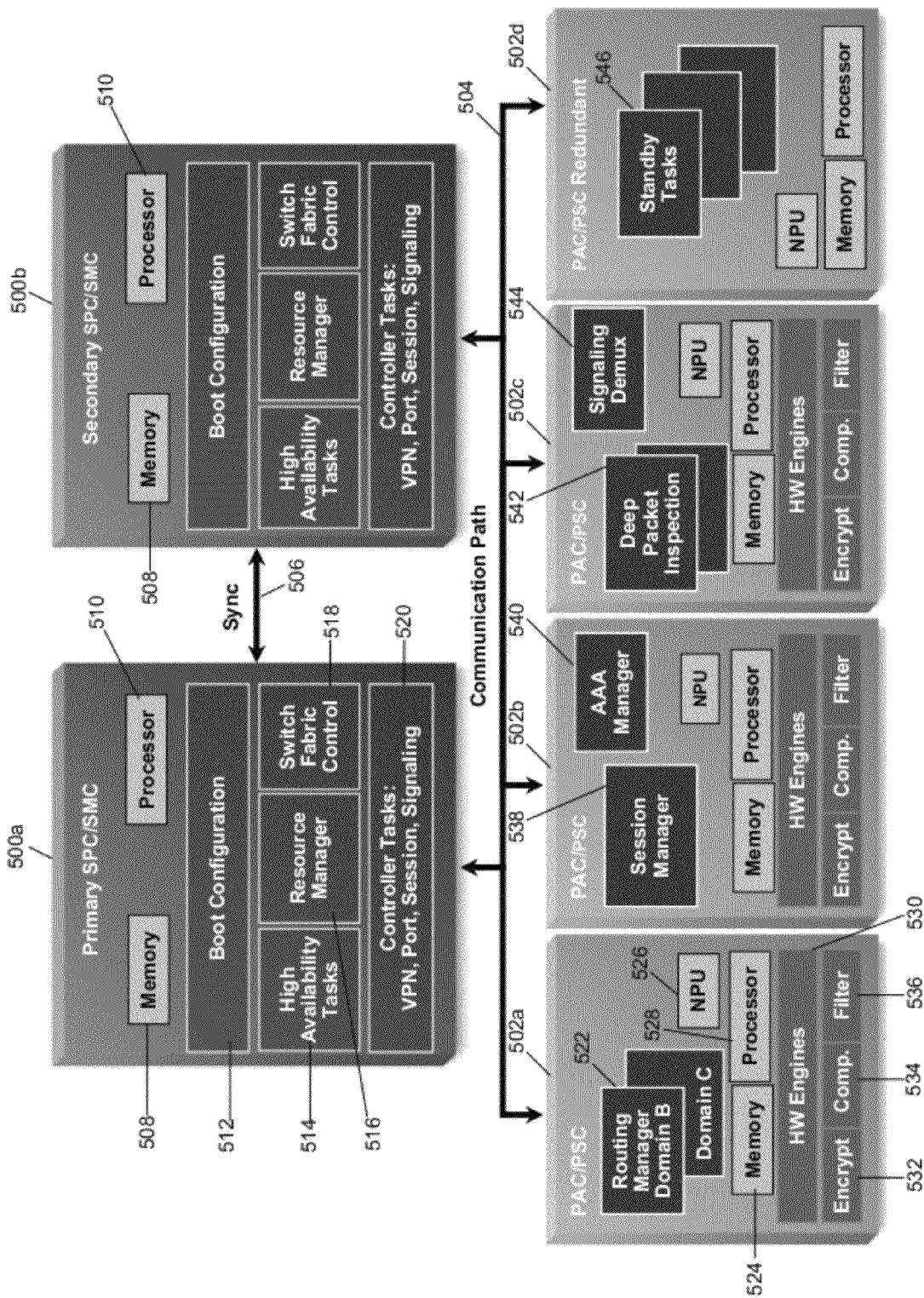
FIG. 8 illustrates a logical view of the software architecture of a videoconferencing gateway in accordance with certain embodiments.

FIG. 8 illustrates a logical view of the software architecture of a network device in accordance with certain embodiments. As shown, the software and hardware can be distributed within the network device and across different circuit boards, processors, and memory. FIG. 8 includes a primary switch processor card (SPC)/system management card (SMC) 500*a*, a secondary SPC/SMC 500*b*, PAC/PSC 502*a*-502*d*, a communication path 504, and a synchronization path 506. The SPC/SMC 500 include a memory 508, a processor 510, a boot configuration 512, high availability tasks 514, resource manager 516, switch fabric control 518, and controller tasks 520.

The SPC/SMC 500 manage and control the network device including the other cards in the network device. The SPC/SMC 500 can be configured in a primary and secondary arrangement that provides redundancy and failsafe protection. The modules or tasks running on the SPC/SMC 500 are related to network device wide control and management. The boot configuration task 512 includes information for starting up and testing the network device. The network device can also be configured to startup in different configurations and providing different implementations. These can include which functionalities and services are capable of running on the SPC/SMC 500. The high availability task 514 maintains the operational state of the network device by monitoring the device and managing recovery efforts to avoid disruption of service. The resource manager tracks and assigns the available resources for sessions and demands on the network device. This can include load balancing among different processors and tasks running on the network device. Processes can be distributed across the system to fit the needs of the network model and specific process requirements. For example, most tasks can be configured to execute on SPC/SMC 500 or a PAC/PSC 502, while some processor intensive tasks can also be performed across multiple PACs/PSCs to utilize multiple CPU resources. Distribution of these tasks is invisible to the user. The switch fabric control 518 controls the communication paths in the network device. The controller tasks module 520 can manage the tasks among the resources of the networks to provide, for example, VPN services, assign ports, and create, delete, and modify sessions for mobile devices.

The PAC/PSC 502 are high-speed processing cards that are designed for packet processing and the tasks involved with providing various network functionalities on the network device. The PAC/PSC 502 include a memory 524, a network processing unit (NPU) 526, a processor 528, a hardware engine 530, an encryption component 532, a compression component 534, and a filter component 536. Hardware engines 530 can be deployed with the card to support parallel distributed processing for compression, classification traffic scheduling, forwarding, packet filtering, and statistics compilations. The components can provide specialize processing that can be done more efficiently than using a general processor in some embodiments.

Each PAC/PSC 502 is capable of supporting multiple contexts. The PAC/PSC 502 are also capable of running a variety of tasks or modules. PAC/PSC 502a provides routing managers 522 with each covering routing of a different domain. PAC/PSC 502b provides a session manager 538 and an AAA manager 540. The session manager 538 manages one or more sessions that correspond to one or more mobile devices. A session allows a mobile device to communicate with the network for voice calls and data. The AAA manager 540 manages accounting, authentication, and authorization with an AAA server in the network. PAC/PSC 502 provides a deep packet inspection task 542 and a signaling demux 544. The deep packet inspection task 542 provides inspection of packet information beyond layer 4 for use and analysis by the network device. The signaling demux 544 can provide scalability of services in combination with other modules. PAC/PSC 502d provides redundancy through standby tasks 546. Standby tasks 546 store state information and other task information so that the standby task can immediately replace an active task if a card fails or if there is a scheduled event to remove a card.

In some embodiments, the software needed for implementing a process or a database includes a high level procedural or an object-orientated language such as C, C++, C#, Java, or Perl. The software may also be implemented in assembly language if desired. Packet processing implemented in a network device can include any processing determined by the context. For example, packet processing may involve high-level data link control (HDLC) framing, header compression, and/or encryption. In certain embodiments, the software is stored on a storage medium or device such as read-only memory (ROM), programmable-read-only memory (PROM), electrically erasable programmable-read-only memory (EEPROM), flash memory, or a magnetic disk that is readable by a general or special purpose-processing unit to perform the processes described in this document. The processors can include any microprocessor (single or multiple core), system on chip (SoC), microcontroller, digital signal processor (DSP), graphics processing unit (GPU), or any other integrated circuit capable of processing instructions such as an x86 microprocessor.

Although the present disclosure has been described and illustrated in the foregoing example embodiments, it is understood that the present disclosure has been made only by way of example, and that numerous changes in the details of implementation of the disclosure may be made without departing from the spirit and scope of the disclosure, which is limited only by the claims which follow. Other embodiments are within the following claims. For example, gateway 120 may implement the features of session border control 180 in addition to the other features ascribed to gateway 120, above.

What is claimed is:

1. A method comprising:
    establishing a wireless communication session with a mobile device;
    determining that the mobile device is associated with a mobile videoconferencing application, wherein the mobile videoconferencing application is capable of sending and receiving media streams; and
    providing, from a mobile network to a videoconferencing system within a fixed network, a first set of indicators associated with the communication session, and
    performing policy control, the policy control including:
        causing the videoconferencing system within the fixed network to be configured for communicating with the mobile device, wherein the configuration is different from a configuration used by the videoconferencing system for communicating with videoconferencing end points within the fixed network, and
        causing a session bearer within the mobile network to be adjusted to meet a quality of service (QoS) requirement of a videoconferencing media stream connected to the mobile device, the session bearer carrying the videoconferencing media stream, and
        causing a media bridge to process the videoconferencing media stream, wherein the videoconferencing media stream is processed by the media bridge using an operating mode that is different than an operating mode used for processing media streams for videoconferencing end points within the fixed network.

2. The method of claim 1, wherein at least one of the indicators of the first set of indicators is provided using one of a Session Description Protocol (SDP) 'servclass' attribute and an Internet Media Services (IMS) P-Access-Network-Info header.

3. The method of claim 1, wherein causing a media bridge to process the videoconferencing media stream includes causing the media bridge to enhance a perceived continuity of a data flow.

4. The method of claim 1, wherein determining that the mobile device is associated with a videoconferencing application is performed using deep packet inspection.

5. The method of claim 1, wherein the first set of indicators associated with the communication session includes an indication of at least one of:
    an association of the mobile device with a mobile videoconferencing application,
    a use by the mobile device of the mobile network,
    a type of the mobile network,
    an identity of a network component performing the policy control,
    a type of implementation of the mobile videoconferencing application,
    operational constraints on parameter choices within the mobile network,
    a mobile network's ability to cover gaps in media delivery,
    transcoding/transrating options for the media streams,
    quality of service schemes supported by the mobile network, and
    the mobile network's ability to split the communication session over multiple communication paths.

6. The method of claim 1, further comprising in response to determining that the mobile device is associated with the videoconferencing application, providing from the videoconferencing system in the fixed network to the mobile network a second set of indicators associated with the communication session, wherein the second set of indicators include an indication of at least one of:
- a use of interactive real-time media service,
- a videoconferencing service category,
- a type of videoconferencing service,
- an identity of a component within the videoconferencing system that is modifying signaling,
- a type of videoconferencing system implementation,
- operational constraints on parameter choices within the videoconferencing system,
- the videoconferencing system's ability to cover gaps in media delivery,
- video codec options supported by the videoconferencing system, and
- constraints due to subscriber configuration of the videoconferencing system.

7. A system comprising:
a mobile gateway within a mobile network, the mobile network supporting a wireless communication session with a mobile device within the mobile network; and
a media bridge,
wherein the mobile gateway includes a first interface capable of receiving an indicator that the mobile device is using a mobile videoconferencing application, and a second interface to the media bridge, and
wherein the mobile gateway is configured to, in response to receiving the indicator, cause a session bearer within the mobile network to be adjusted to meet a quality of service (QoS) requirement of a videoconferencing media stream connected to the mobile device, wherein the session bearer carries the videoconferencing media stream, and
wherein the mobile gateway is configured to, in response to receiving the indicator, cause the media bridge to process the videoconferencing media stream using an operating mode that is different than an operating mode used for processing media streams for videoconferencing end points within a network.

8. The system of claim 7, further comprising a session border control in communication with the first interface and with a fixed network, the session border control configured to send the indicator to the first interface in response to the session border control determining, using deep packet inspection, that the mobile device is using a mobile videoconferencing application.

9. The system of claim 7, wherein the mobile gateway receives the indicator using one of a Session Description Protocol (SDP) 'servclass' attribute and an internet media services (IMS) P-Access-Network-Info header.

10. The system of claim 7, wherein the mobile gateway further includes a third interface to a videoconferencing call manager within a fixed network, the third interface configured to communicate information related to the communication session of the mobile videoconferencing mobile device, and wherein the mobile gateway is further configured to, in response to receiving the indicator, request that the call manager be configured for communicating with the mobile device, wherein the configuration is different from a configuration used by the call manager for communicating with a videoconferencing end point within the fixed network.

11. The system of claim 10, wherein the mobile gateway is configured to send to the videoconferencing call manager a set of indicators, the set of indicators including at least one of:
- an association of the mobile device with a mobile videoconferencing application,
- a use by the mobile device of the mobile network,
- a type of the mobile network,
- an identity of a network component performing the policy control
- a type of implementation of the mobile videoconferencing application,
- operational constraints on parameter choices within the mobile network,
- the mobile network's ability to cover gaps in media delivery,
- transcoding/transrating options for the media streams,
- quality of service schemes supported by the mobile network, and
- the mobile network's ability to split the communication session over multiple communication paths.

12. Logic encoded in one or more non-transient media that includes code for execution and when executed by a processor is operable to perform operations comprising:
establishing a wireless communication session with a mobile device;
determining that the mobile device is associated with a mobile videoconferencing application, wherein the mobile videoconferencing application is capable of sending and receiving media streams; and
providing, from a mobile network to a videoconferencing system within a fixed network, a first set of indicators associated with the communication session, and
performing policy control, the policy control including:
causing the videoconferencing system within the fixed network to be configured for communicating with the mobile device, wherein the configuration is different from a configuration used by the videoconferencing system for communicating with videoconferencing end points within the fixed network, and
causing a session bearer within the mobile network to be adjusted to meet a quality of service (QoS) requirement of a videoconferencing media stream connected to the mobile device, the session bearer carrying the videoconferencing media stream, and
causing a media bridge to process the videoconferencing media stream, wherein the videoconferencing media stream is processed by the media bridge using an operating mode that is different than an operating mode used for processing media streams for videoconferencing end points within the fixed network.

13. The logic of claim 12, wherein at least one of indicators of the first set of indicators is provided using one of a Session Description Protocol (SDP) 'servclass' attribute and an Internet Media Services (IMS) P-Access-Network-Info header.

14. The logic of claim 12, wherein causing a media bridge to process the videoconferencing media stream includes causing the media bridge to enhance a perceived continuity of a data flow.

15. The logic of claim 12, wherein determining that the mobile device is associated with a videoconferencing application is performed using deep packet inspection.

16. The logic of claim 12, wherein the first set of indicators associated with the communication session includes an indication of at least one of:
- an association of the mobile device with a mobile videoconferencing application,
- a use by the mobile device of the mobile network, a type of the mobile network,
an identity of a network component performing the policy control,
a type of implementation of the mobile videoconferencing application,
operational constraints on parameter choices within the mobile network,
the mobile network's ability to cover gaps in media delivery,
transcoding/transrating options for the media streams,
quality of service schemes supported by the mobile network, and
the mobile network's ability to split the communication session over multiple communication paths.

17. The logic of claim 12, further comprising in response to determining that the mobile device is associated with the videoconferencing application, providing from the videoconferencing system in the fixed network to the mobile network a second set of indicators associated with the communication session, wherein the second set of indicators include an indication of at least one of:
a use of interactive real-time media service,
a videoconferencing service category,
a type of videoconferencing service,
an identity of a component within the videoconferencing system that is modifying signaling,
a type of videoconferencing system implementation,
operational constraints on parameter choices within the videoconferencing system,
the videoconferencing system's ability to cover gaps in media delivery,
video codec options supported by the videoconferencing system, and
constraints due to subscriber configuration of the videoconferencing system.

18. A method comprising:
establishing a wireless communication session between a videoconferencing system within a fixed network and a mobile device in a mobile network, the videoconferencing system including a call manager capable of handling calls between videoconferencing end points, and a media bridge capable of providing multipoint communication between videoconferencing end points;
receiving a notification that the mobile device is associated with a mobile videoconferencing application, wherein the videoconferencing application is capable of sending and receiving media streams;
causing the call manager to switch from a base operating mode, configured for communications with a fixed switching videoconferencing end point, to a mobile operating mode for communications with the mobile videoconferencing application; and
causing the media bridge to support a media stream for the mobile videoconferencing application and to switch from a base operating mode for communications with a fixed switching videoconferencing end point to a mobile operating mode for communications with the mobile videoconferencing application.

19. The method of claim 18, wherein the notification is provided using one of a Session Description Protocol (SDP) 'servclass' attribute and an Internet Media Services (IMS) P-Access-Network-Info header.

20. The method of claim 18, wherein the operating mode for communications with the mobile videoconferencing application includes causing the media bridge to enhance a perceived continuity of a data flow.

21. The method of claim 18, further comprising providing from the videoconferencing system in the fixed network to the mobile network a set of indicators associated with the communication session, wherein the set of indicators include an indication of at least one of:
a use of interactive real-time media service,
a videoconferencing service category,
a type of videoconferencing service,
an identity of a component within the videoconferencing system that is modifying signaling,
a type of videoconferencing system implementation,
operational constraints on parameter choices within the videoconferencing system,
the videoconferencing system's ability to cover gaps in media delivery,
video codec options supported by the videoconferencing system, and
constraints due to subscriber configuration of the videoconferencing system.

22. A system comprising:
a videoconferencing call manager within a fixed network, wherein the call manager is capable of handling calls between videoconferencing end points, and the fixed network is capable of supporting a communication session with a mobile device within a mobile network; and
a media bridge capable of providing multipoint communication between videoconferencing end points,
wherein the videoconferencing call manager includes a first interface capable of receiving a first indicator that the mobile device is using a mobile videoconferencing application, and a second interface to the media bridge, and
wherein the videoconferencing call manager is configured to, in response to receiving the first indicator, switch from a base operating mode, for communications with a fixed switching videoconferencing end point, to a mobile operating mode for communications with the mobile videoconferencing application, and
wherein the videoconferencing call manager is configured to, in response to receiving the first indicator, cause the media bridge to provide a videoconferencing media stream to the mobile videoconferencing application, using an operating mode that is different than an operating mode used for providing media streams for videoconferencing end points within the fixed network.

23. The system of claim 22, further comprising a session border control in communication with the first interface and with the mobile network, the session border control configured to send the first indicator to the first interface in response to the session border control determining, using deep packet inspection, that the mobile device is using a mobile videoconferencing application.

24. The system of claim 22, wherein the call manager receives the first indicator using one of a Session Description Protocol (SDP) 'servclass' attribute and an internet media services (IMS) P-Access-Network-Info header.

25. The system of claim 22, wherein the call manager further includes a third interface to a mobile gateway within the mobile network, the third interface configured to communicate information related to a videoconferencing system, and wherein the call manager is configured to send to the mobile gateway a second indicator, the indicator comprising one of:
a use of interactive real-time media service,
a videoconferencing service category,
a type of videoconferencing service, an identity of a component within the videoconferencing system that is modifying signaling,
a type of videoconferencing system implementation,
operational constraints on parameter choices within the videoconferencing system,
the videoconferencing system's ability to cover gaps in media delivery,
video codec options supported by the videoconferencing system, and
constraints due to subscriber configuration of the videoconferencing system.

26. The system of claim 22, wherein the first interface is also capable of receiving a second set of indicators, the second set of indicators including at least one of:
an association of the mobile device with a mobile videoconferencing application,
a use by the mobile device of the mobile network,
a type of the mobile network,
an identity of a network component performing policy control,
a type of implementation of the mobile videoconferencing application,
operational constraints on parameter choices within the mobile network,
the mobile network's ability to cover gaps in media delivery,
transcoding/transrating options for the media streams,
quality of service schemes supported by the mobile network, and
the mobile network's ability to split the communication session over multiple communication paths.

27. Logic encoded in one or more non-transient media that includes code for execution and when executed by a processor is operable to perform operations comprising:
establishing a wireless communication session between a videoconferencing system within a fixed network and a mobile device in a mobile network, the videoconferencing system including a call manager capable of handling calls between videoconferencing end points, and a media bridge capable of providing multipoint communication between videoconferencing end points;
receiving a notification that the mobile device is associated with a mobile videoconferencing application, wherein the videoconferencing application is capable of sending and receiving media streams;
causing the call manager to switch from a base operating mode, configured for communications with a fixed switching videoconferencing end point, to a mobile operating mode for communications with the mobile videoconferencing application; and
causing the media bridge to support a media stream for the mobile videoconferencing application and to switch from a base operating mode for communications with a fixed switching videoconferencing end point to a mobile operating mode for communications with the mobile videoconferencing application.

28. The logic of claim 27, wherein the notification is provided using one of a Session Description Protocol (SDP) 'servclass' attribute and an Internet Media Services (IMS) P-Access-Network-Info header.

29. The logic of claim 27, wherein the operating mode for communications with the mobile videoconferencing application includes causing the media bridge to enhance a perceived continuity of a data flow.

30. The logic of claim 27, further comprising providing from the videoconferencing system in the fixed network to the mobile network a set of indicators associated with the communication session, wherein the set of indicators include an indication of at least one of:
a use of interactive real-time media service,
a videoconferencing service category,
a type of videoconferencing service,
an identity of a component within the videoconferencing system that is modifying signaling,
a type of videoconferencing system implementation,
operational constraints on parameter choices within the videoconferencing system,
the videoconferencing system's ability to cover gaps in media delivery,
video codec options supported by the videoconferencing system, and
constraints due to subscriber configuration of the videoconferencing system.

\* \* \* \* \*